(12) United States Patent
Mosayyebpour Kaskari et al.

(10) Patent No.: US 12,524,498 B2
(45) Date of Patent: Jan. 13, 2026

(54) MULTI-OBJECT DETECTION WITH SINGLE DETECTION PER OBJECT

(71) Applicant: Synaptics Incorporated, San Jose, CA (US)

(72) Inventors: Saeed Mosayyebpour Kaskari, Irvine, CA (US); Atabak Pouya, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 313 days.

(21) Appl. No.: 18/335,025

(22) Filed: Jun. 14, 2023

(65) Prior Publication Data
US 2023/0326167 A1    Oct. 12, 2023

Related U.S. Application Data

(63) Continuation-in-part of application No. 17/138,889, filed on Dec. 30, 2020, now abandoned.

(51) Int. Cl.
    *G06F 18/21*      (2023.01)
    *G06N 3/084*      (2023.01)
    (Continued)

(52) U.S. Cl.
    CPC .......... *G06F 18/217* (2023.01); *G06N 3/084* (2013.01); *G06V 10/776* (2022.01); *G06V 10/82* (2022.01); *G10L 15/063* (2013.01); *G10L 15/16* (2013.01)

(58) Field of Classification Search
    CPC ...... G06F 18/217; G06N 3/084; G06N 3/044; G06V 10/776; G06V 10/82; G10L 15/063; G10L 15/16
    See application file for complete search history.

(56) References Cited

U.S. PATENT DOCUMENTS

| 2019/0130220 A1* | 5/2019 | Zou ................... G06F 18/2413 |
| 2019/0147602 A1* | 5/2019 | Tao ...................... G06V 10/809 |
| | | 382/103 |

(Continued)

FOREIGN PATENT DOCUMENTS

| CN | 110580487 A | 12/2019 |
| CN | 111444976 A | 7/2020 |
| GB | 2597266 A | 1/2022 |

OTHER PUBLICATIONS

Hu et al, "Boundary Shape-Preserving Model for Building Mapping From High-Resolution Remote Sensing Images" (published in IEEE Transactions on Geoscience and Remote Sensing, vol. 61, May 2023).*

(Continued)

*Primary Examiner* — Casey L Kretzer
(74) *Attorney, Agent, or Firm* — Paradice & Li LLP

(57) ABSTRACT

Systems and methods for classification of data comprise optimizing a neural network by minimizing a rhino loss value, including receiving a training batch of data samples comprising a plurality of samples for each of a plurality of classifications, extracting features from the samples to generate a batch of features, processing the batch of features using a neural network to generate a plurality of classifications to differentiate the samples, computing a rhino loss value for the training batch based, at least in part, on the classifications, and modifying weights of the neural network to reduce the rhino loss value.

20 Claims, 16 Drawing Sheets

(51) Int. Cl.
  *G06V 10/776* (2022.01)
  *G06V 10/82* (2022.01)
  *G10L 15/06* (2013.01)
  *G10L 15/16* (2006.01)

(56) References Cited

U.S. PATENT DOCUMENTS

2020/0054306 A1 2/2020 Mehanian et al.
2020/0265591 A1 8/2020 Yang et al.
2021/0124993 A1 4/2021 Singh et al.
2021/0134002 A1 5/2021 Yao et al.

OTHER PUBLICATIONS

Girshick, "Fast R-CNN," Proceedings of the IEEE International Conference on Computer Vision, pp. 1440-1448, 2015.
Girshick et al., "Rich Feature Hierarchies for Accurate Object Detection and Semantic Segmentation," CVPR '14 Proceedings of the 2014 IEEE Conference on Computer Vision and Pattern Recognition, pp. 580-587, 2014.
Redmon et al., "YOLO9000: Better, Faster, Stronger," IEEE Conference on Computer Vision and Pattern Recognition (CVPR), 6517--6525, Honolulu, HI: CVPR 2017.
Redmon et al., "You Only Look Once: Unified, Real-Time Object Detection," Proceedings of the IEEE Conference on Computer Vision and Pattern Recognition (CVPR), 779-788. Las Vegas, NV: CVPR, 2016.
Ren et al., "Faster R-CNN: Towards Real-Time Object Detection with Region Proposal Networks," Advances in Neural Information Processing Systems, vol. 28, pp. 1-14, 2015.
Zheng et al., "Dislance-IoU Loss: Faster and Better Learning for Bounding Box Regression," The Thirty Fourth AAAI Conference on Artificial Intelligence (AAI-20), pp. 12993-13000, 2020.
Zitnick et al., "Edge boxes: Localing Object Proposals from Edges," Computer Vision—ECCV, Springer International Publishing. pp. 1-15, 2014.

* cited by examiner

1500

Obtain a frame of first input data and a frame of first ground truth data, wherein the frame of first ground truth data is associated with a first binary mask having a plurality of first values and a second binary mask having a plurality of second values
1510

Map the frame of first input data to a frame of first output data based on a neural network algorithm, wherein the frame of first output data is associated with a plurality of first probability values
1520

Determine a first detection loss based at least in part on a product of a respective probability value of the plurality of first probability values and a respective value of the plurality of first values
1530

Determine a first non-detection loss based at least in part on a product of the respective probability value of the plurality of first probability values and a respective value of the plurality of second values
1540

Update the neural network algorithm based at least in part on the first detection loss and the first non-detection loss
1550

FIG. 15

MULTI-OBJECT DETECTION WITH SINGLE DETECTION PER OBJECT

CROSS-REFERENCE TO RELATED APPLICATION

This application is a continuation-in-part of U.S. patent application Ser. No. 17/138,889, entitled "MULTI-OBJECT DETECTION WITH SINGLE DETECTION PER OBJECT," filed on Dec. 30, 2020, which is incorporated by reference herein in its entirety.

TECHNICAL FIELD

The present application, in accordance with one or more embodiments, relates generally to classification systems and methods and, more particularly, for example, to systems and methods for training and/or implementing multi-object classification systems and methods.

BACKGROUND

Object detection is often implemented as a computer vision technique for locating instances of objects in images or videos. Object detection algorithms typically leverage machine learning or deep learning to produce meaningful results. When humans look at images or video, humans can recognize and locate objects of interest within a matter of moments. A goal of object detection is to replicate this intelligence using a computer. In some systems, objects are detected in an image by an object detection process and a bounding box is defined surrounding each detected object with an identification of an object class. For example, an image of a neighborhood may include a dog, a bicycle and a truck, that are each detected and classified.

Object detection is used in a variety of real-time systems, such as advanced driver assistance systems that enable cars to detect driving lanes or perform pedestrian detection to improve road safety. Object detection is also useful in applications such as video surveillance, image retrieval, and other systems. Object detection problems are often solved using deep learning, machine learning, and other artificial intelligence systems. Popular deep learning-based approaches use convolutional neural networks (CNNs), such as regions with convolutional neural networks (R-CNN), You Look Only Once (YOLO), and other approaches that automatically learn to detect objects within images.

In one approach for object detection through deep learning, a custom object detector is created and trained. To train a custom object detector from scratch, a network architecture is designed to learn the features for the objects of interest, using a large set of labeled data to train the CNN. The results of a custom object detector are acceptable for many applications. However, these systems may require a lot of time and effort to set up the layers and weights in the CNN. In a second approach, a pretrained object detector is used. Many object detection workflows using deep learning leverage transfer learning, an approach that enables the system to start with a pretrained network and then fine-tune the pretrained network for a particular application. This method can provide faster results because the object detectors have already been trained on thousands, or even millions, of images, but has other drawbacks in terms of complexity and accuracy.

In view of the forgoing, there is a continued need in the art for improved object detection and classification systems and methods.

SUMMARY

The present disclosure is directed to systems and methods for object detection and classification. In various embodiments, improved systems and methods are described that can be used for a variety of classification problems including object detection and speech recognition tasks. In some embodiments, improved training methods incorporate a "rhino" loss function to force a machine learning model to activate only one time for each respective object (or phoneme) detected. These approaches reduce the complexity of full system solutions, including eliminating the need in many embodiments for conventional post-processing that is typically applied after the classification step. For example, in some object detection systems, a post-processing step called Non-Maximum suppression is used to reject redundant detections per object. This post-processing not only increases the computational complexity, it also decreases the performance. The single-detection systems and methods disclosed herein provide advantages over such systems.

Various embodiments disclosed herein can be used without conventional post-processing, greatly reducing the amount of computational complexity in run-time and increasing effectiveness to accurately estimate small objects. In addition, the training system can converge faster than other, state-of-the-art methods. In a speech recognition task, for example, a system of the present disclosure is configured to apply a heavy decoding algorithm in order to decode the speech letters from the input data. In practice, the decoding can be less than optimal due to a trade-off between the amount of processing and the performance using the search algorithm. The techniques disclosed herein can greatly simplify the decoding part of speech recognition and it can improve the performance while reducing the computational complexity.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

FIG. 15 is a flowchart depicting an example operation for training a neural network, in accordance with one or more embodiments of the present disclosure.

DETAILED DESCRIPTION

Figure 1:
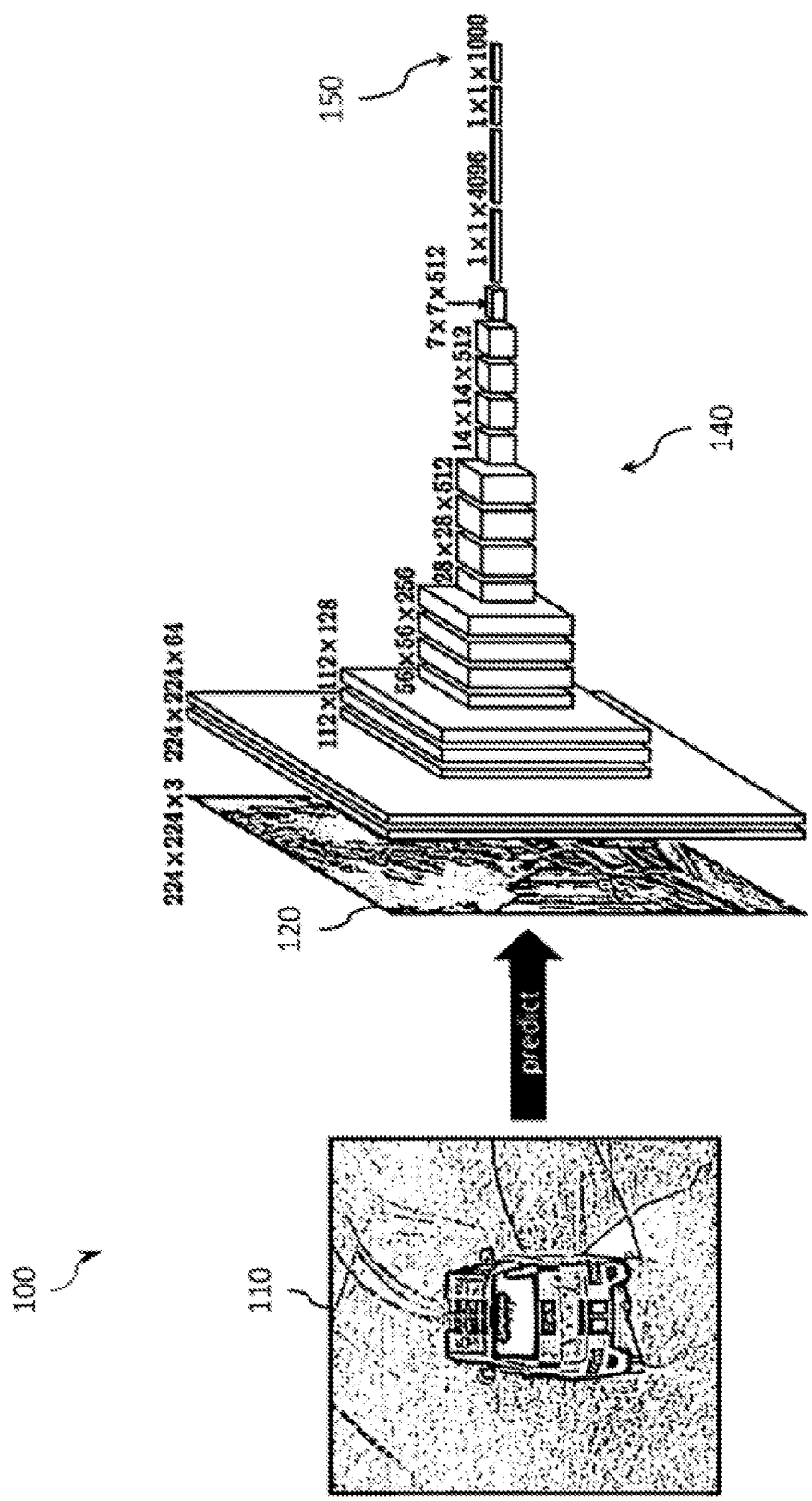
FIG. 1 illustrates an example backbone network for use in an object detection process, in accordance with one or more embodiments of the present disclosure.

The present disclosure is directed to improved systems and methods for object detection and/or classification. The techniques disclosed herein can be applied generally to classification problems, including voice detection and authentication in audio, object detection and classification in an image, and/or other classification problems. For example, a two-dimensional classification problem may include an object detection process directed to identifying and locating objects of certain classes in an image. Object localization can be done in various ways, including creating a bounding box around the object. A one-dimensional classification problem, for example, may include phoneme recognition. In phoneme recognition, unlike object detection in an image, the system receives a sequence of data. The detection of classes in a sequence is often important when detecting speech. In the present disclosure, improved techniques are described that can be applied to various classification systems, including an object detection problem (as an example of a 2-D classification problem) and a phoneme recognition problem (as an example of a 1-D classification problem with sequential data).

Whether a classification system includes a custom object detector or uses a pretrained one, the system designer decides what type of object detection network to use (e.g., a two-stage network or a single-stage network). The initial stage of two-stage networks, such as R-CNN and its variants, identifies region proposals, or subsets of the image that might contain an object. The second stage classifies the objects within the region proposals. Two-stage networks can achieve accurate object detection results, but are typically slower than single-stage networks.

In single-stage networks, such as YOLO v2, the CNN produces network predictions for regions across an image using anchor boxes, and the predictions are decoded to generate the final bounding boxes for the objects. Single-stage networks can be much faster than two-stage networks, but may not reach the same level of accuracy, especially for scenes containing small objects. However, single-stage networks are simpler, more computationally efficient object detectors, and are more practical to use in many end-user products.

Many conventional object detector techniques require the use of a post-processing stage, such as non-max suppression, in order to disregard redundant detections for each object. For example, an object detector may detect a single object (e.g., a car) three different times and place three different bounding boxes around the object. After using the non-max suppression, the estimation of highest confidence will be retrieved while the others will be rejected allowing each object to be identified using a single bounding box. This post-processing stage can impose additional computational complexity especially when the number of objects per image is high. Embodiments of the deep learning-based techniques disclosed herein include a single-stage object detector that does not require the post-processing stage such as non-max suppression, which can improve the performance of estimation for multi-class object detection.

Referring to the figures, embodiments of the present disclosure will now be described. The present disclosure introduces a novel network that can recognize the multi-class objects and localize them with one bounding box per object. The proposed technique is a pretrained object detector that leverages the transfer learning in order to build a single-stage object detector.

In order to understand what is in an image, the input image is fed through a convolutional network to build a rich feature representation of the original image. This part of the architecture may be referred to herein as the "backbone" network, which is pre-trained as an image classifier to learn how to extract features from an image. In this approach, it is recognized that image classification may be easier and cheaper to label than a full image as it only requires a single label as opposed to defining bounding box annotations for each image. The training can be conducted on a large labeled dataset (e.g., ImageNet) in order to learn good feature representations.

An example of a backbone network is illustrated in FIG. 1 and will now be described in accordance with one or more embodiments. A convolutional neural network 100 (for example, a VGG network) may be implemented using an architecture configured to receive and process an input image 110 from a training dataset for image classification. The input image 110 is converted to a fixed size and image format 120 and then passed through a plurality of convolutional layers 140, which include rectified linear activation functions, max pooling layers, a softmax output layer 150, and/or other processing steps.

Figure 2:
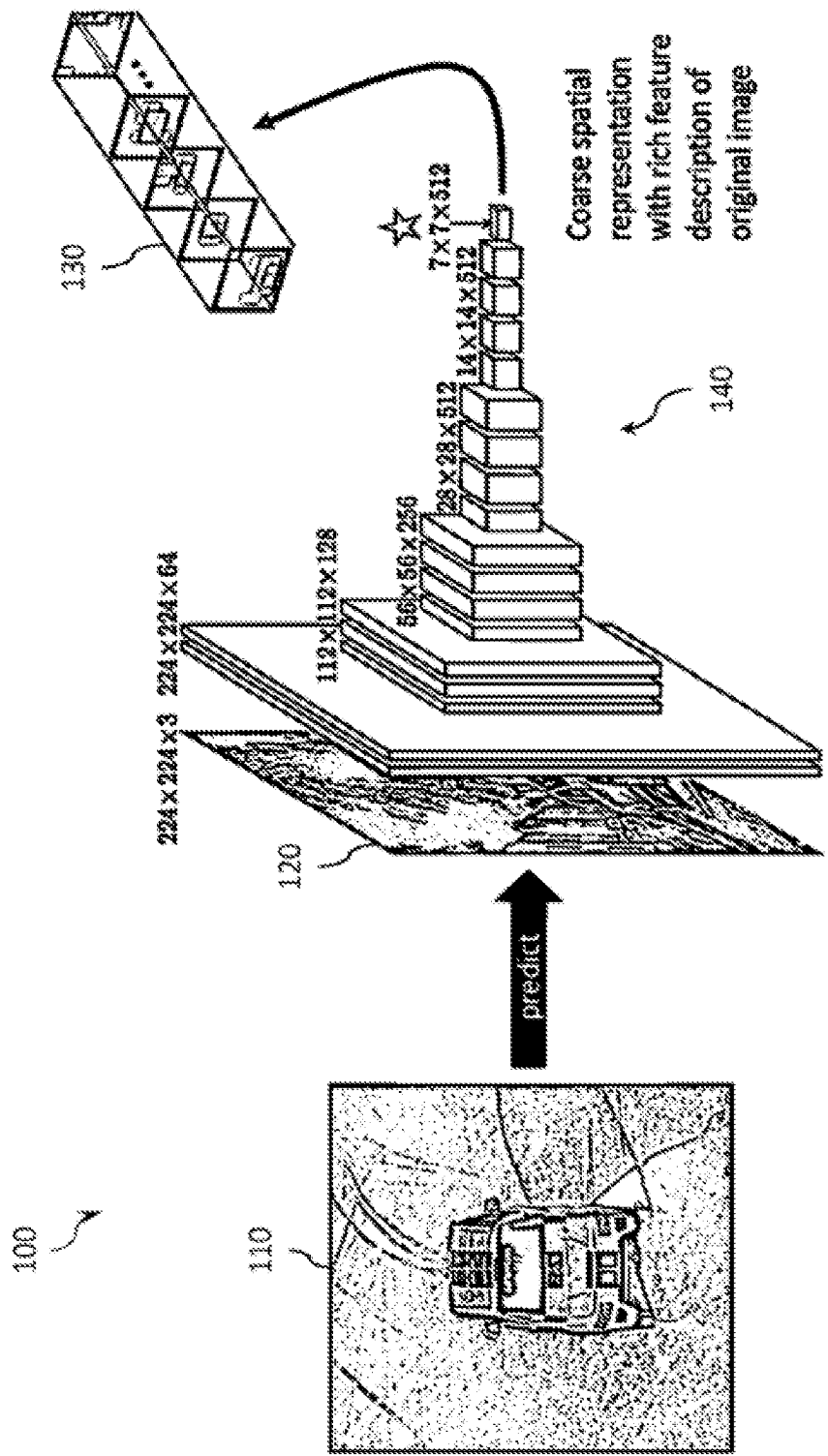
FIG. 2 illustrates an example object detection process, in accordance with one or more embodiments of the present disclosure.

Referring to FIG. 2, after pre-training the backbone architecture 100 as an image classifier, the last few layers of the network are removed so that the backbone network 100 outputs a collection of stacked feature maps 130 which describe the original image in a low spatial resolution albeit a high feature (channel) resolution. In the illustrated example, a 7×7×512 representation of the image observation includes 512 feature maps describing different characteristics of the original image 110.

Figure 3:
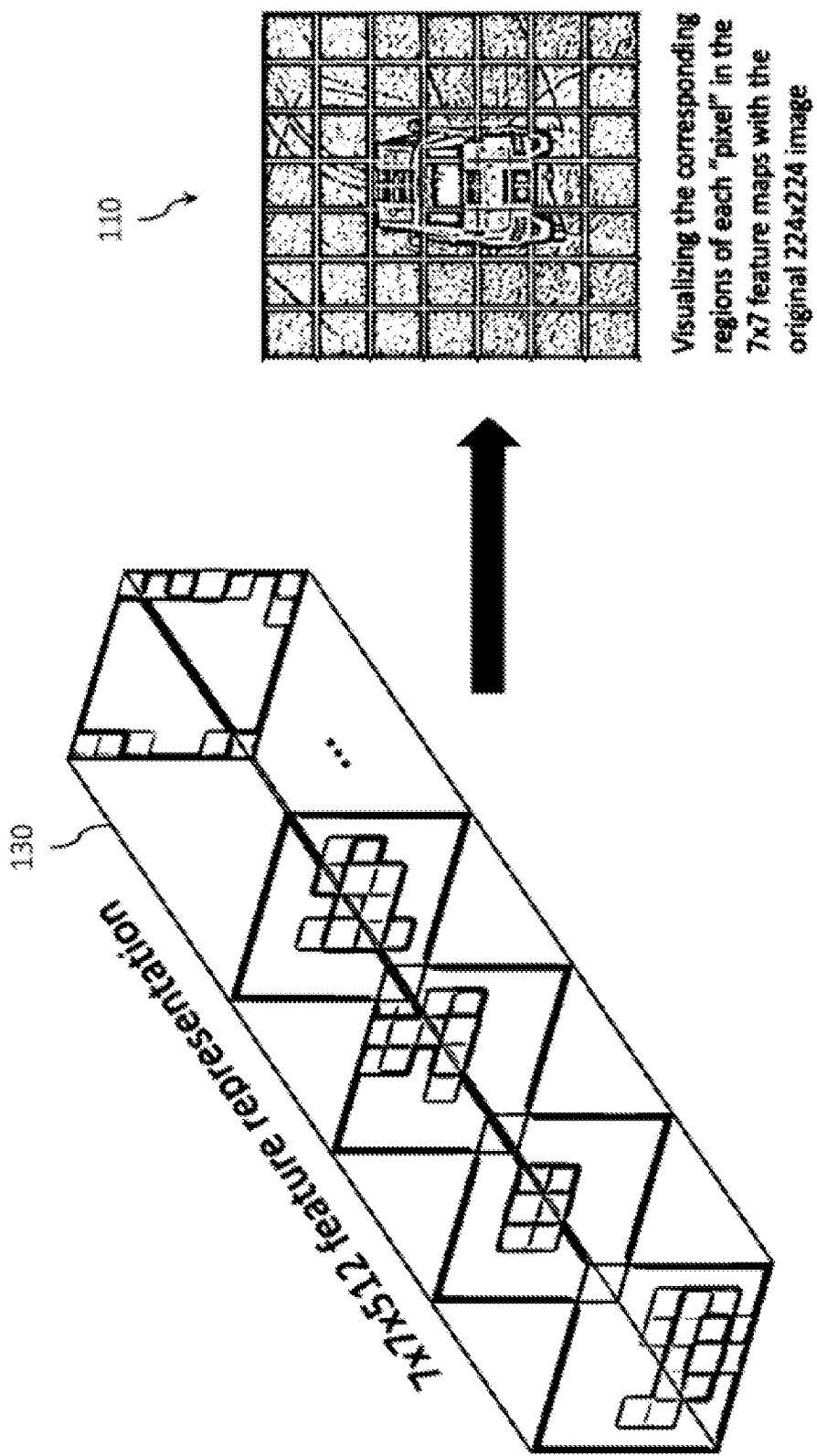
FIG. 3 illustrates an example object detection process, in accordance with one or more embodiments of the present disclosure.
Figure 4:
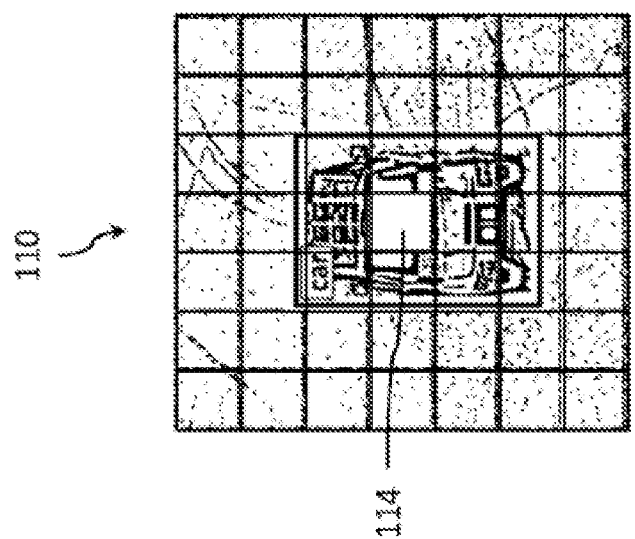
FIG. 4 illustrates an example object detection process including images of a detected car, in accordance with one or more embodiments of the present disclosure.
Figure 4:
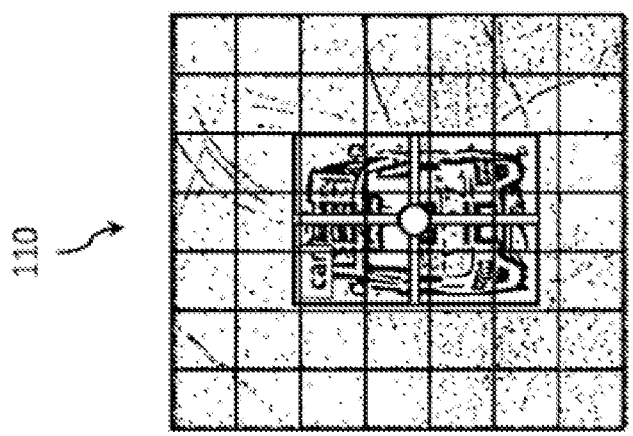
Figure 4:
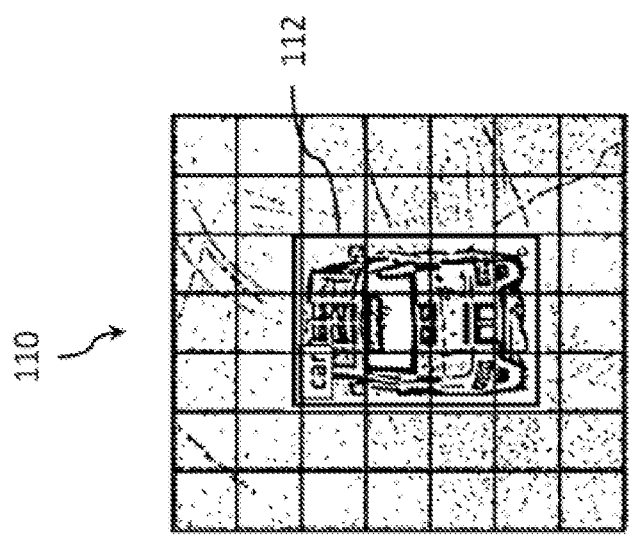
Figure 5:
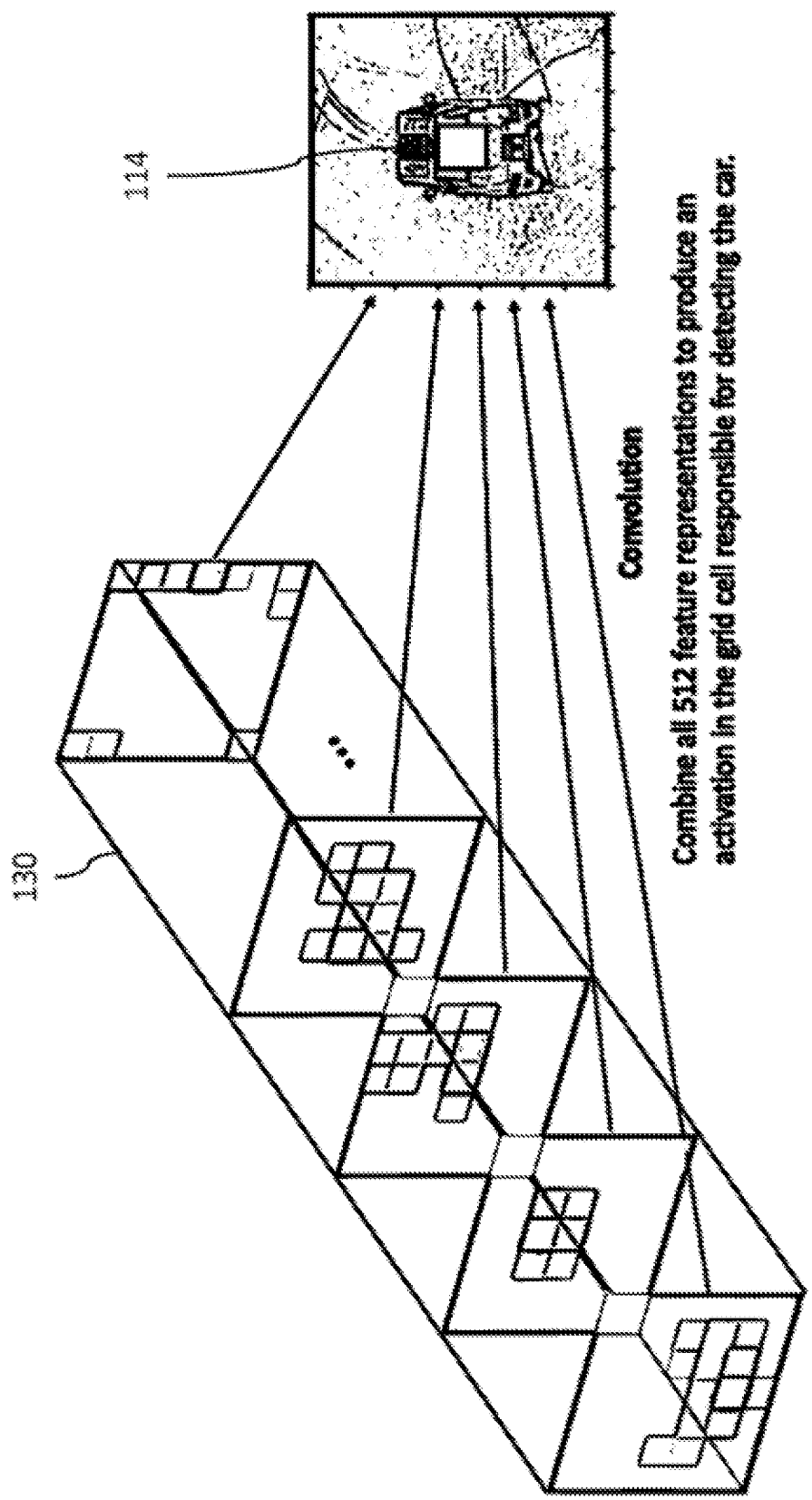
FIG. 5 illustrates an example object detection process, including a combination of feature representations to produce activations in the grid cell responsible for detecting a car, in accordance with one or more embodiments of the present disclosure.

Referring to FIG. 3, the 7×7 grid 130 can be related back to the original input image 110 in order to understand what each grid cell represents relative to the original image. From this data, the system can also determine roughly where objects are located in the coarse (7×7) feature maps by observing which grid cell contains the center of a ground truth bounding box annotation. This grid cell can be identified as being "responsible" for detecting that specific object (or as being representative of the specific object detected). Referring to FIG. 4, for example, a car is identified in a ground truth bounding box 112, the center of the bounding box 112 is identified, and a corresponding grid cell 114 is identified as the cell "responsible" for detecting the car. Referring to FIG. 5, the feature representations from the grid 130 are combined to produce an activation in the grid cell 114 responsible for the detecting the car (e.g., by activating a neuron corresponding to the grid cell 114).

Figure 6:
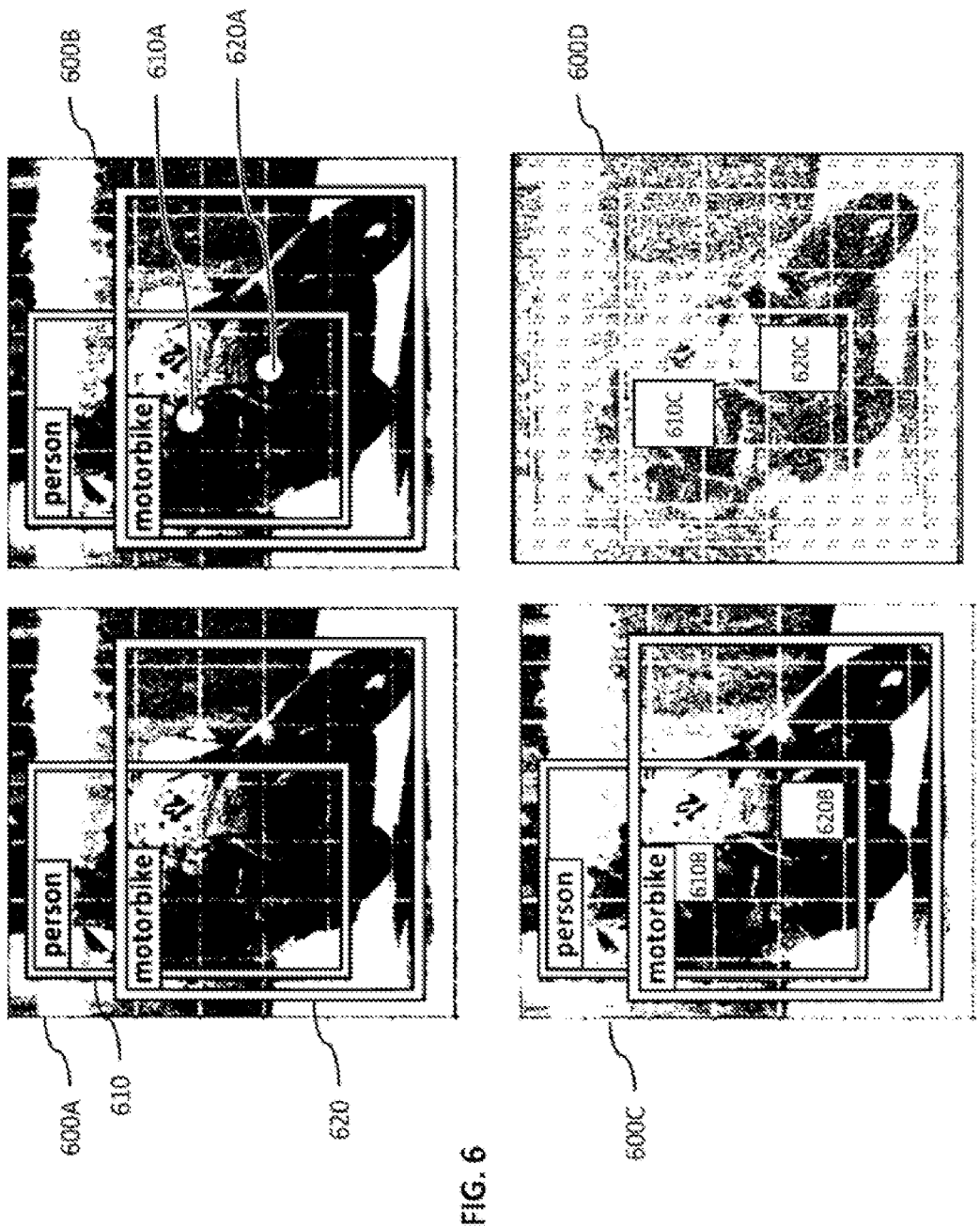
FIG. 6 illustrates an example object detection process for an image including a person riding a motorcycle, in accordance with one or more embodiments of the present disclosure.

If the input image contains multiple objects, then multiple activations can be identified on the grid denoting that an object is in each of the activated regions. For example, as illustrated in the example of FIG. 6, two objects are detected in an image, namely a "person" and a "motorbike". In the first image 600A, a ground truth bounding box 610 bounds the detected person, and a ground truth bounding box 620 bounds the motorbike. In the next image 600B, the center 610A of the ground truth bounding box 610 and the center 620A of the ground truth bounding box 620 are identified. The corresponding grid cells 610B and 620B, respectively, are illustrated in image 600C. The output of the last layer of the network has two activations, 610C and 620C of image 600D, related to the two objects.

Figure 7:
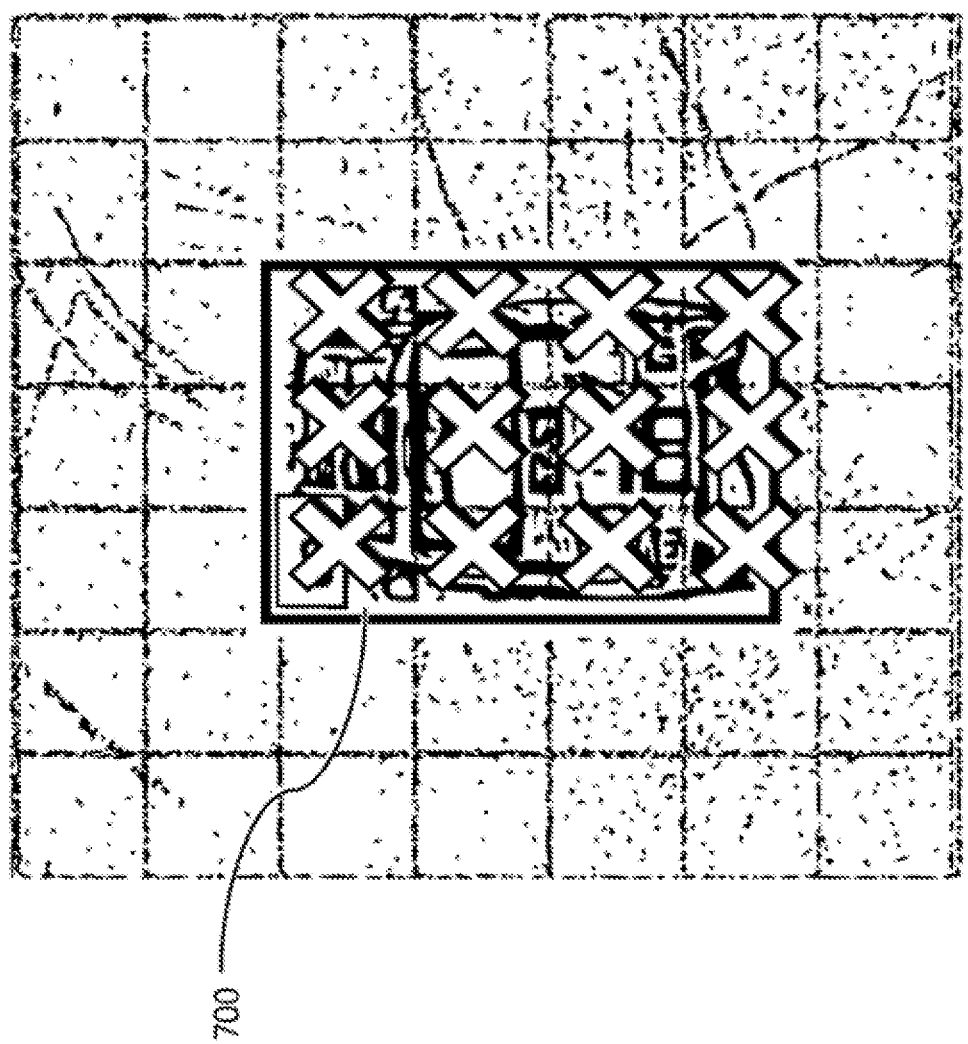
FIG. 7 illustrates an example bounding box and cell grid, in accordance with one or more embodiments of the present disclosure.

In various embodiments disclosed herein, the network learns to find the responsible grid cell to be used for detection of the object. In other words, the network will choose all the grid cells that are inside a ground truth bounding box of the object, such as the grid cells marked with an "X" in FIG. 7, to be the target grid cells that will be used to detect the car in the bounding box 700. Then the network will train to choose one of these target grid cells to activate and use it to detect the object.

Figure 8:
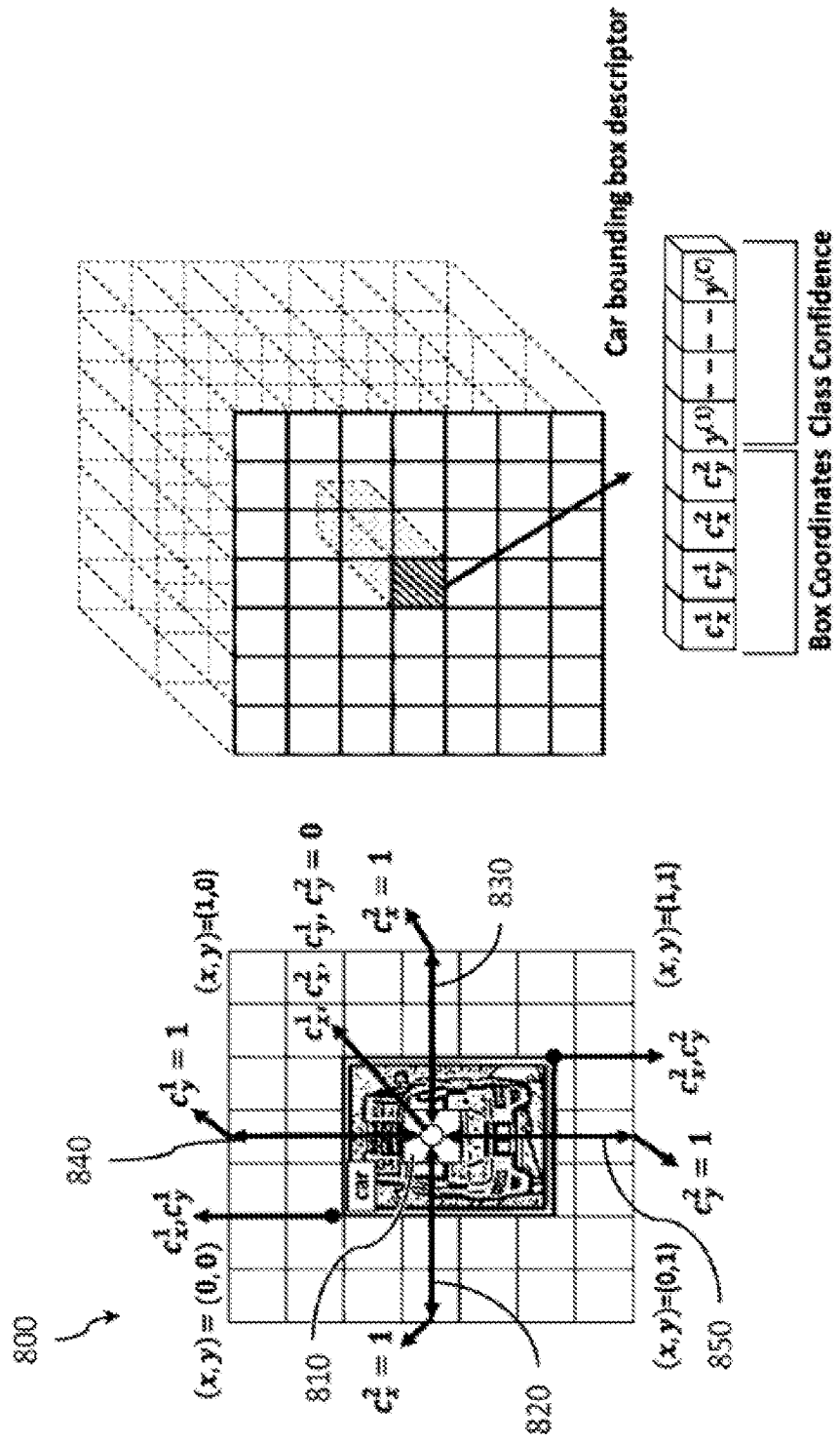
FIG. 8 illustrates an example bounding box and cell grid, in accordance with one or more embodiments of the present disclosure.
Figure 9:
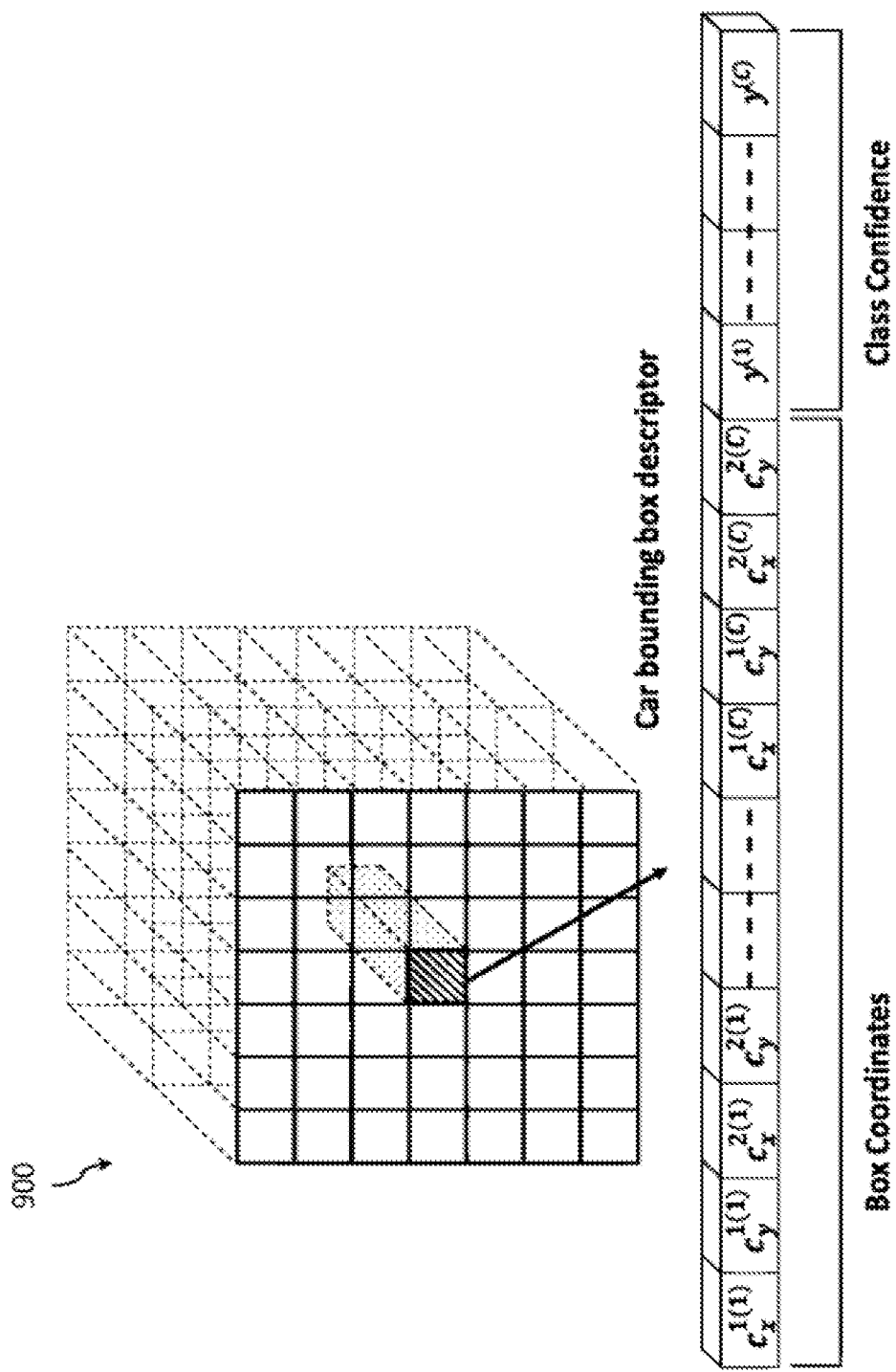
FIG. 9 illustrates an example object detection process using a bounding box and cell grid, in accordance with one or more embodiments of the present disclosure.

In some embodiments, the last layer generates an N*N output probability for each class (here it is assumed N=7 in a 7×7 grid). Assuming the number of classes is C, then there will be N*N*C output probabilities ($y^{(1)}, \ldots, y^{(C)}$). For each of N*N grid cells, the last layer also generates four coordinates $c_x^1, c_y^1, c_x^2, c_y^2$ corresponding to the estimated four outputs which are related to the position of the x-axis and y-axis of the two corners on the top left and bottom right of the rectangular bounding box as it is shown in FIG. 8. The outputs of the network are obtained after using a sigmoid function resulting in numbers between zero and one. The reference point for each grid cell is the center of the grid cell as it is shown by the circle inside the grid cell 810. The center of the grid cell corresponds to $c_x^1=c_y^1=c_x^2=c_y^2=0$. $c_x^1$, $c_y^1$ moves the left corner of the rectangular bounding box to the upper left region of the image and $c_x^2$, $c_y^2$ moves the right corner of the rectangular bounding box to the right bottom region of the image. So $c_x^1$ moves along the horizontal arrow 820 in the image when the value changes from zero to one, $c_x^2$ moves along the horizontal arrow 830 in the image when the value changes from zero to one, while $c_y^1$ moves along the vertical arrow 840 in the image 800 when the value changes from zero to one, and $c_y^2$ moves along the vertical arrow 850 in the image 800 when the value changes from zero to one. The estimated coordinates using $c_x^1, c_y^1, c_x^2, c_y^2$ will be mapped to the x and y axes of the image by considering the left corner of the image to have (x,y)=(0,0) and the right bottom corner of the image to have (x,y)=(1,1) as it is shown in the image below. The estimated mapped coordinates for each grid cell will be named as $m_x^1, m_y^1, m_x^2, m_y^2$.

The likelihood that a grid cell contains an object of class j is defined as $y^{(j)}$, and the number of classes is C. If all the $y^{(j)}$ for all grid cells are close to zero, then there is a determination that no object is detected in the image.

Four bounding box descriptors are used to describe the x-y coordinate of the upper left corner of the bounding box ($c_x^1, c_y^1$) and bottom right corner of the bounding box ($c_x^2, c_y^2$). These values will be mapped to get the corresponding values ($m_x^1, m_y^1, m_x^2, m_y^2$) considering the reference point of (x=0,y=0) on the upper left corner of the image and (x=1,y=1) on the bottom right corner of the image.

Thus, the network is configured to learn a convolution filter for each of the above attributes such that it produces 4+C output channels to describe a single bounding box at each grid cell location. This means that the network will learn a set of weights to look across all feature maps (in the above example it is assumed to be 512 feature maps) to evaluate the grid cells.

In some aspects, the size of the neural network model (the "model") may be increased by introducing new parameters to learn for each class to estimate the bounding box. In other words, there will be 5*C outputs for each grid cell instead of 4+C outputs as shown in the figure below. This will enlarge the model size at the output layer, and may improve the performance of the model for the objects that have different aspect ratios or shapes. In this embodiment, there are 4+C outputs for each grid cell unless stated otherwise.

Figure 10:
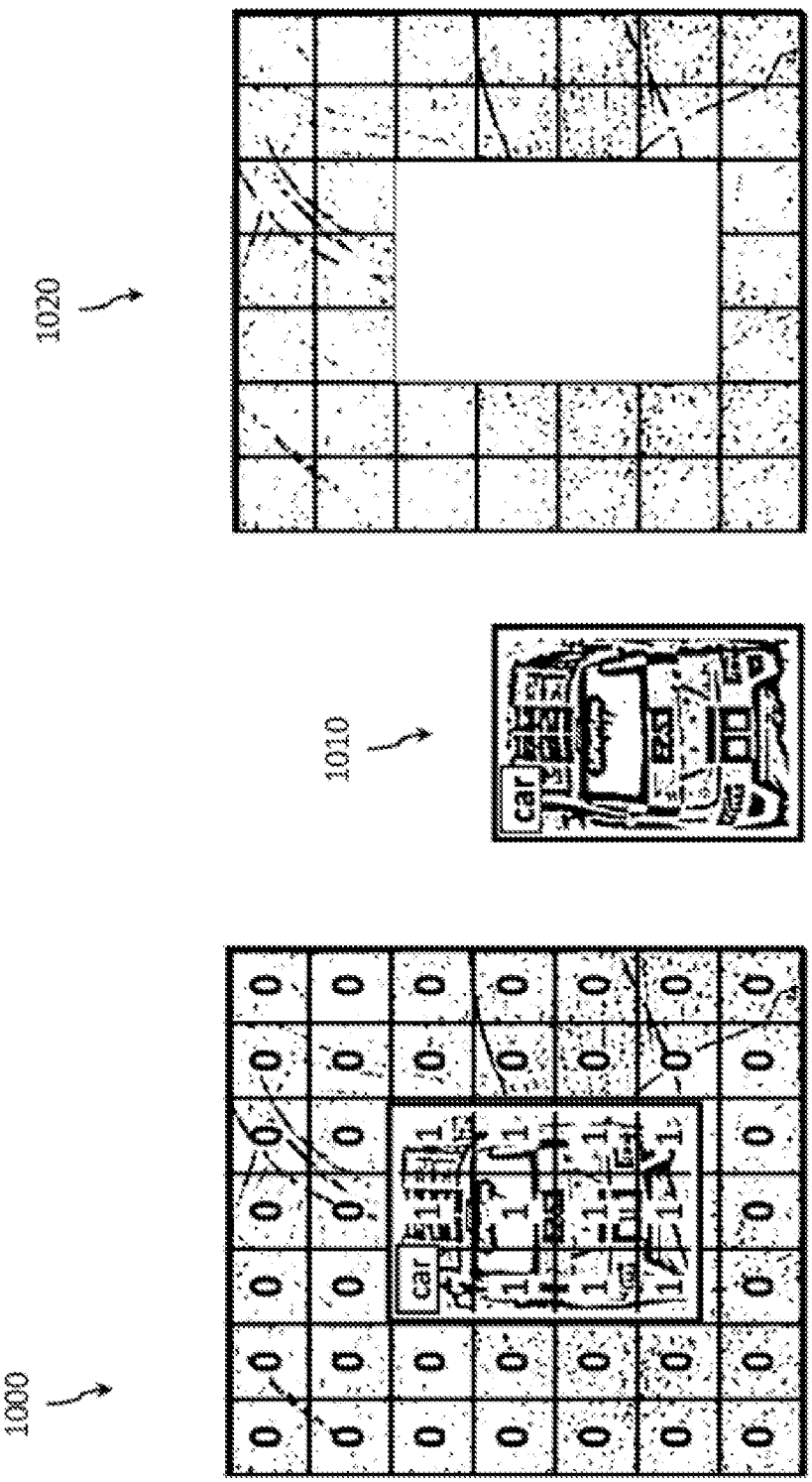
FIG. 10 illustrates an example bounding box and cell grid used in an example object detection process, in accordance with one or more embodiments of the present disclosure.

In some aspects, during training of a neural network (the "network"), a rhino loss function may be used to force the network to detect each object in an image (or each phoneme in a sequence of audio frames) using only one respective grid cell activation. Without loss of generality, it is assumed the number of classes is one (C=1) and the object of interest is a "car". In some embodiments, the network may produce an estimated "car" confidence score $y_n^{(1)}$ and estimated bounding box coordinates, $m_{xn}^1, m_{yn}^1, m_{xn}^2, m_{yn}^2$, for the n-th grid cell. In each image, each object is shown with a rectangular bounding box around it as its ground truth. All the grid cells inside the ground truth bounding box for a given object will be considered as target grid cells that will be used to detect the object. For example, a car object in image 800 of FIG. 8 and image 1000 of FIG. 10 has a ground truth bounding box with twelve grid cells as the target grid cells. Slices of network output corresponding to each object are extracted. When all the slices are extracted and there are no more objects left in the image, the remaining image will belong to background objects. For example, there is only one object in the image 1000 of FIG. 10 and a slice 1010 corresponding to this object is extracted from the image 1000 and the remaining image (or background) is shown in an image 1020 on the right. In some aspects, a ground truth binary mask can be generated and used to generate each respective slice. The ground truth binary mask includes a value of one for each grid cell in the slice of the object and a value of zero for each grid cell elsewhere. For example, as illustrated in FIG. 10, the image 1000 includes a ground truth binary mask for a "car" object, where the ground truth binary mask has values equal to one inside a ground truth bounding box and zero elsewhere. As illustrated in FIG. 10, the ground truth binary mask may be used to generate the slice 1010 representing the car extracted from the image 1000, and the remaining image 1020.

The rhino loss function ($L_{rhino}$ (i)) for an ith sample of data (e.g., a frame of image data or a frame of audio data) and a total detection loss function ($L_{rhino}^{total}$) for a batch of data of size D is given below.

The total number of grid cells=$N^2$

The number of objects or phonemes (or slices) for the jth class of the ith sample of the data=$S_{ij}$ The number of classes=C The ground truth binary mask of the sth object (or phoneme) for the jth class of the ith sample of the data=$msk_{n,s}^{(j)}(i)$ $$d_{n,s}^{(j)}(i) = y_n^{(j)}(i) * msk_{n,s}^{(j)}(i), \quad (1)$$

$i = 0, \ldots, D-1, s = 0, \ldots, S_{ij}-1, j = 0, \ldots, C-1, n = 0, \ldots, N^2-1$ $$L_{det}^{obj}(i) = -\sum_{j=0}^{C-1} \sum_{s=0}^{S_{ij}-1} \log\left(P_s^{(j)}(i)\right) \quad (2)$$

$$P_{n,s}^{(j)}(i) = \sum_{n=0}^{N^2-1} p_{n,s}^{(j)}(i) \quad (3)$$

$$p_{n,s}^{(j)}(i) = \left(1 - d_{0,s}^{(j)}(i)\right)\left(1 - d_{1,s}^{(j)}(i)\right) \ldots \left(d_{n,s}^{(j)}(i)\right) \ldots \left(1 - d_{N^2-1,s}^{(j)}(i)\right) \quad (4)$$

$$Msk_n^{(j)}(i) = \max\left(\sum_{s=0}^{S_{ij}-1} msk_{n,s}^{(j)}(i), 1\right) \quad (5)$$

$$mskg_n^{(j)}(i) = 1 - Msk_n^{(j)}(i) \quad (6)$$

$g_n^{(j)}(i) = y_n^{(j)}(i) * mskg_n^{(j)}(i), i = 0, \ldots, D-1, j = 0, \ldots, C-1,$ $n = 0, \ldots, N^2-1 \quad (7)$ $$L_{det}^{no-obj}(i) = -\sum_{j=0}^{C-1} \sum_{n=0}^{N^2-1} \left(g_n^{(j)}(i)\right)^\gamma \log\left(1 - g_n^{(j)}(i)\right) \quad (8)$$

γ≥0 is a hyperparameter that needs to be tuned for the training $$L_{rhino}(i) = L_{det}^{obj}(i) + L_{det}^{no-obj}(i) \quad (9)$$

$$L_{rhino}^{total} = \frac{1}{D}\sum_{i=1}^{D} L_{rhino}(i) \quad (10)$$

In some aspects, a rhino loss computed using the rhino loss function ($L_{rhino}$(i)) of Equation 9 represents, for an ith sample, an amount of error in a neural network output. That is, the rhino loss represents a difference between a neural network output for the ith sample and a corresponding ground truth binary mask (e.g., a ground truth binary mask paired with the ith sample). Similarly, a total detection loss computed using the total detection loss function ($L_{rhino}^{total}$) of Equation 10 represents, for a batch of D samples, an amount of error in neural network outputs. In other words, the total detection loss represents a difference between neural network outputs for the batch of D samples and corresponding ground truth binary masks (where each of the ground truth binary masks is paired with a respective sample of the D samples).

Figure 11B:
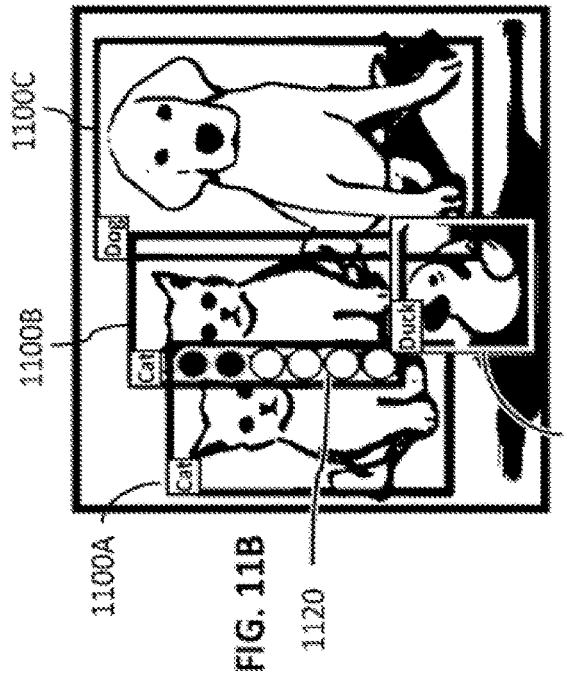
FIGS. 11A-C illustrate an example object detection and classification process, in accordance with one or more embodiments of the present disclosure.
Figure 11A:
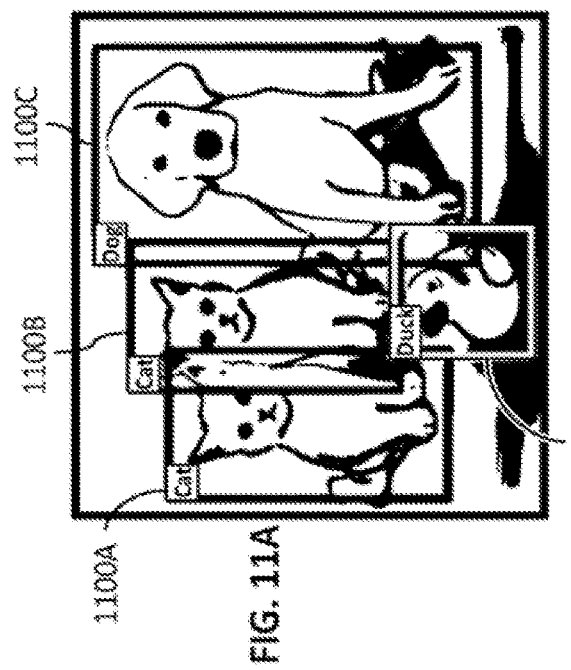
Figure 11C:
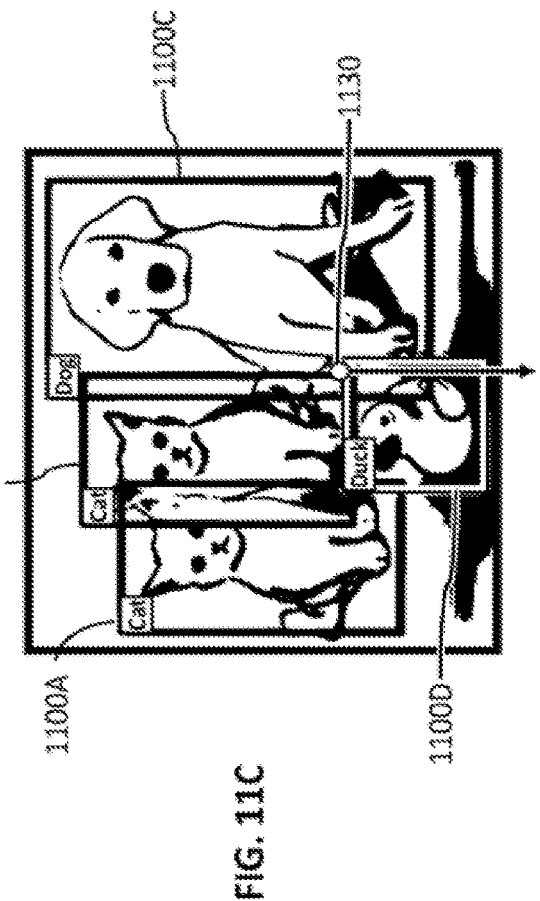

Embodiments of the rhino loss function with overlapping bounding boxes using reassignment will now be described with reference to FIGS. 11A, 11B and 11C. As illustrated, bounding boxes of the same class (e.g., bounding boxes 1100A and 1100B) may overlap and so the ground truth binary masks corresponding to the respective objects depicted within the bounding boxes (e.g., bounding boxes 1100A and 1100B) may also overlap. For example, there are three classes, "cat", "dog" and "duck," in the images of FIGS. 11A-C, and all of the bounding boxes (1100A, 1100B, 1100C, and 1100D) of these objects have overlapping regions. As a result, the ground truth binary masks corresponding to these overlapping objects are modified in various embodiments.

In one embodiment, the ground truth binary mask (the "mask") of each overlapping object is modified at each update of the training. The modified mask is called $\widetilde{msk}_{n,s}^{(j)}(i)$. To do this, the following rhino soft target score ($rhino_{n,s}^{(j)}(i)$) is computed for each object ($\forall s$).

$$rhino_{n,s}^{(j)}(i) = \frac{p_{n,s}^{(j)}(i)}{P_s^{(j)}(i)}, \quad (11)$$

$i = 0, \ldots, D-1, s = 0, \ldots, S_{ij}-1, j = 0, \ldots, C-1, n = 0, \ldots, N^2-1$ The rhino soft target score will be computed for each grid cell of all the objects. Then the object of any class that has the maximum metric value will have a mask for that object to be one. For example, in the image of FIG. 11B, the two cats have 6 grid cells in an overlap area (e.g., the area 1120 where the bounding boxes 1100A and 1100B overlap). After computing the rhino metric, the system makes a determination assigning the grid cells of the overlap region to one of the objects. For example, in the illustrated embodiment, the system decided that the first two black grid cells belong to the right object represented by bounding box 1100B and the other four white grid cells in the overlap region belong to the left object represented by bounding box 1100A.

In one embodiment, the system replaces the mask in (1) with the modified mask computed using the method below to address the problem of overlapping area of the bounding boxes:

for each i compute $rhino_{n,s}^{(j)}(i)$ for all j, s and n for each n find s* and j* that has maximum value of $rhino_{n,s}^{(j)}(i)$ among all s and j. Set $\widetilde{msk}_{n,s*}^{(j*)}(i)=1$ and $\widetilde{msk}_{n,s}^{(j)}(i)=0$ for other j,s If the number of parameters is increased by having one set of coordinates for each class, then there is no need to modify the mask for overlapping area of objects belonging to different classes. In this case the number of outputs will be changed from $(4+C)*N^2$ to $5*C*N^2$. This can increase the number of parameters of the neural network model (e.g., an object detector model) and it may also improve the performance when the classes do not have similar shapes or aspect ratios (e.g. a person and a car).

In another embodiment, an alternative approach to address the problem of overlapping bounding boxes when two bounding boxes belong to different classes is provided. Note that if the overlapping bounding boxes belong to the same class, then the method that is proposed above with respect to FIGS. 11A and 11B may be used. In this embodiment, overlapping classes for the sth object of the jth class of sample i at the grid cell n are defined as $overlapClass_{n,s}^{(j)}(i)$. For example, in the image of FIG. 11C, which is assumed to be the ith sample of data, there are three classes of "cat" (j=0), "dog" (j=1), and "duck" (j=2). If n is the shared grid cell 1130 that overlaps with all of the three classes as shown in the figure, $overlapClass_{n,s=0}^{(j=2)}(i)=\{0, 1\}$. This is because the "duck" object, which is the first object of class "duck" (s=0), overlaps with the two classes of "cat" and "dog" at grid cell n, and so overlapClass$_{n,s=0}^{(j=2)}$(i) contains the indices of these two classes which are zero and one.

Equation (4) can be revised as follows to address the problem of overlapping bounding boxes of different classes:

$$h_{n,s}^{(j)}(i) = \left(\prod_{k \in overlap\,Class_{n,s}^{(j)}(i)} msk_{m,s}^{(j)}(i)(1 - y_n^{(k)}(i))\right) \quad (12)$$

$$p_{n,s}^{(j)}(i) = (1 - d_{0,s}^{(j)}(i))(1 - d_{1,s}^{(j)}(i)) \ldots (h_{n,s}^{(j)}(i))(d_{n,s}^{(j)}(i)) \ldots (1 - d_{N^2-1,s}^{(j)}(i)) \quad (13)$$

As shown, one additional term ($h_{n,s}^{(j)}(i)$) is added to the multiplications in (4) in order to address the problem of overlapping bounding boxes when the objects belong to different classes. As mentioned above, if there is a mix of intra class and inter class objects, the grid cells of intra class objects may be reassigned using the method previously discussed and the rhino loss function for the inter class objects will be modified as shown in (12)-(13).

The bounding box loss function is designed to estimate the boundary box around the estimated object. The total bounding box loss is defined as follows:

$$LoC_{n,s}^{(j)}(i) = \widetilde{msk}_{n,s}^{(j)}(i)^* rhino_{n,s}^{(j)}(i)^* (1 - IoU_{n,s}^{(j)}(i) + R_{n,s}^{(j)}(B, Bgt)) \quad (14)$$

$$L_{loc}(i) = \sum_{j=0}^{C-1} \sum_{s=0}^{S_{i,j}-1} \sum_{n=0}^{N^2-1} LoC_{n,s}^{(j)}(i) \quad (15)$$

$$L_{loc}^{total} = \frac{1}{D} \sum_{i=1}^{D} L_{det}(i) \quad (16)$$

Where $IoU_{n,s}^{(j)}$ and $R_{n,s}^{(j)}$ are the Intersection over Union (IoU) loss and the penalty term defined in [7] for predicted box B and target box Bgt for each grid cell n of the sth object of the jth class of image i. Both $IoU_{n,s}^{(j)}$ and $R_{n,s}^{(j)}$ will be computed using ($m_{x,n}^1(i)$, $m_{y,n}^1(i)$, $m_{x,n}^2(i)$, $m_{y,n}^2(i)$) outputs for each grid cell n. Please note that the losses are defined in [7] using the height and width of a bounding box and the center points of the bounding boxes. So ($m_{x,n}^1(i)$, $m_{y,n}^1(i)$, $m_{x,n}^2(i)$, $m_{y,n}^2(i)$) which are the x-y coordinates of the upper left and bottom right of a bounding box will be translated to the height/width with center point and then the losses will be computed. In one embodiment, the loss may be computed as described in Zhaohui Zheng1, Ping Wang1, Wei Liu2, Jinze Li3, Rongguang Ye1, and Dongwei Ren "Distance-IoU Loss: Faster and Better Learning for Bounding Box Regression" AAAI 2020, which is incorporated by reference herein.

The total loss function $L^{total}$ is the sum of the bounding box loss and the total detection loss ($L_{rhino}^{total}$) (or the rhino loss ($L_{rhino}$)):

$$L^{total} = L_{rhino}^{total} + \beta * L_{loc}^{total} \quad (17)$$

$\beta > 0$ is a hyperparameter that needs to be tuned to balance the two losses, namely, the total detection loss and the bounding box loss (also referred to as a "localization loss").

Phoneme Recognition

A phoneme recognition task involves recognizing the phoneme of speech (C classes) in a sequence of audio data. This is often the initial step for a speech recognition system. The backbone for phoneme recognition can be a recurrent neural network or CNN. Each output is the confidence score for the probability of detecting the jth class and it is obtained after applying the sigmoid function. Like object detection, a marking window is defined for each phoneme to be classified in a sequence. Note that the marking window is a 1-D array unlike the bounding box of an object detector, which is a 2-D array. So the rhino loss function for the ith sample of data ($L_{rhino}$ (i)) and the total detection loss for a batch of data of size D ($L_{rhino}^{total}$) can be obtained as in (9) and (10), respectively.

Figure 12A:
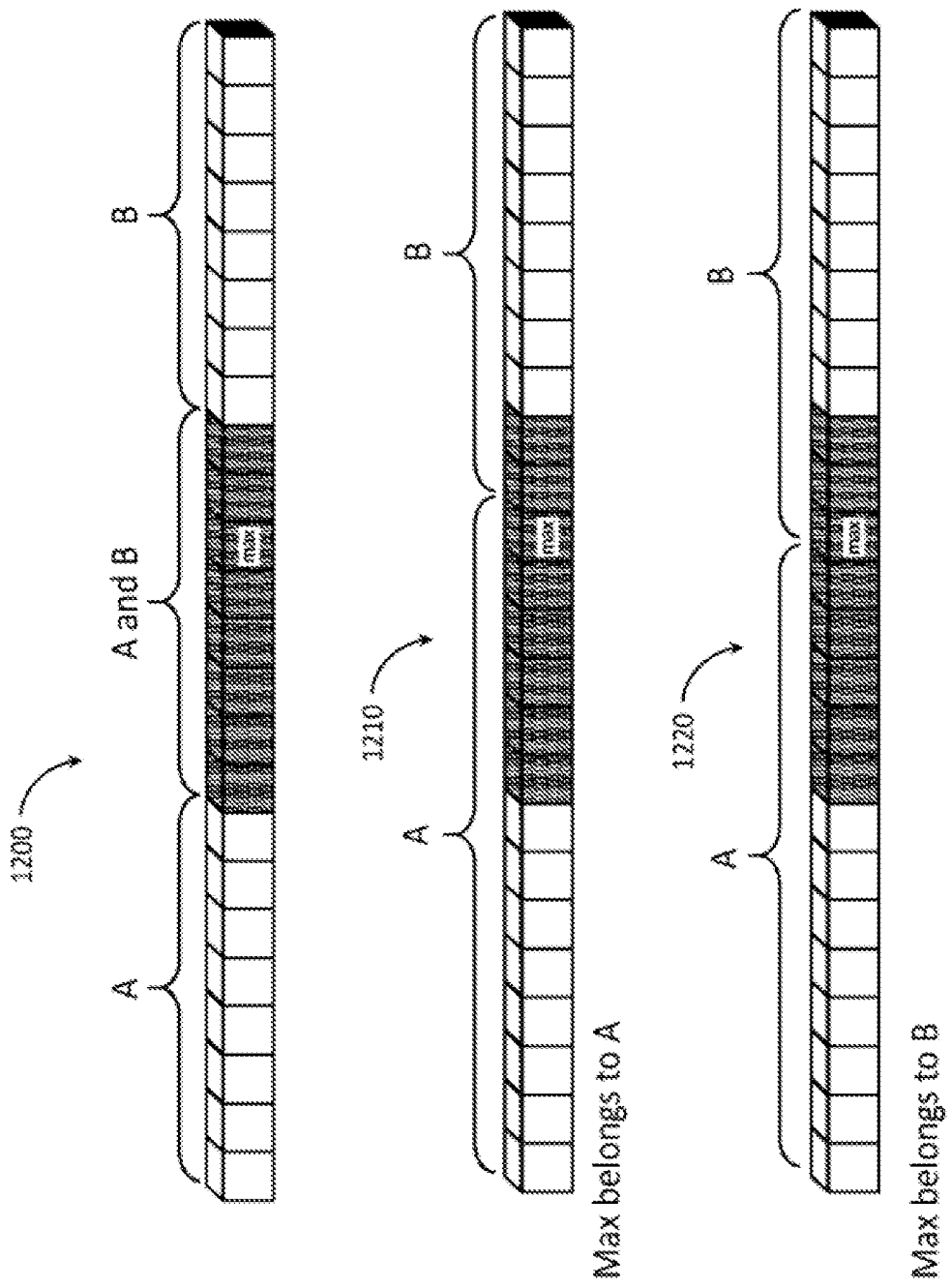
FIGS. 12A-B illustrate an example object detection and classification process, in accordance with one or more embodiments of the present disclosure.

Embodiments of applying the rhino loss function with an overlapping marking window in a sequence of data with reassignment will now be described. As previously explained, if two marking windows have overlapping area, the system will reassign the overlapping area to either of the two classes using a rhino score, such as defined in (11). For example, in FIG. 12A, class A and B have an overlapping area in the middle, which is shown by the shaded region in the sequence of audio frames 1200. Unlike object detection, each frame of data isn't assigned individually based on the rhino score. Instead, the rhino score is computed for the overlapping area for both classes of A and B. Then, a max value of the rhino score over the overlapping area is obtained. Depending on whether this max value belongs to class A or class B, the left area plus the max position or right area plus the max position is reassigned to class A (frames 1210) or class B (frames 1220). Note that this reassignment may affect a marking window and so it will update a ground truth binary mask at each update of the training.

Figure 12B:
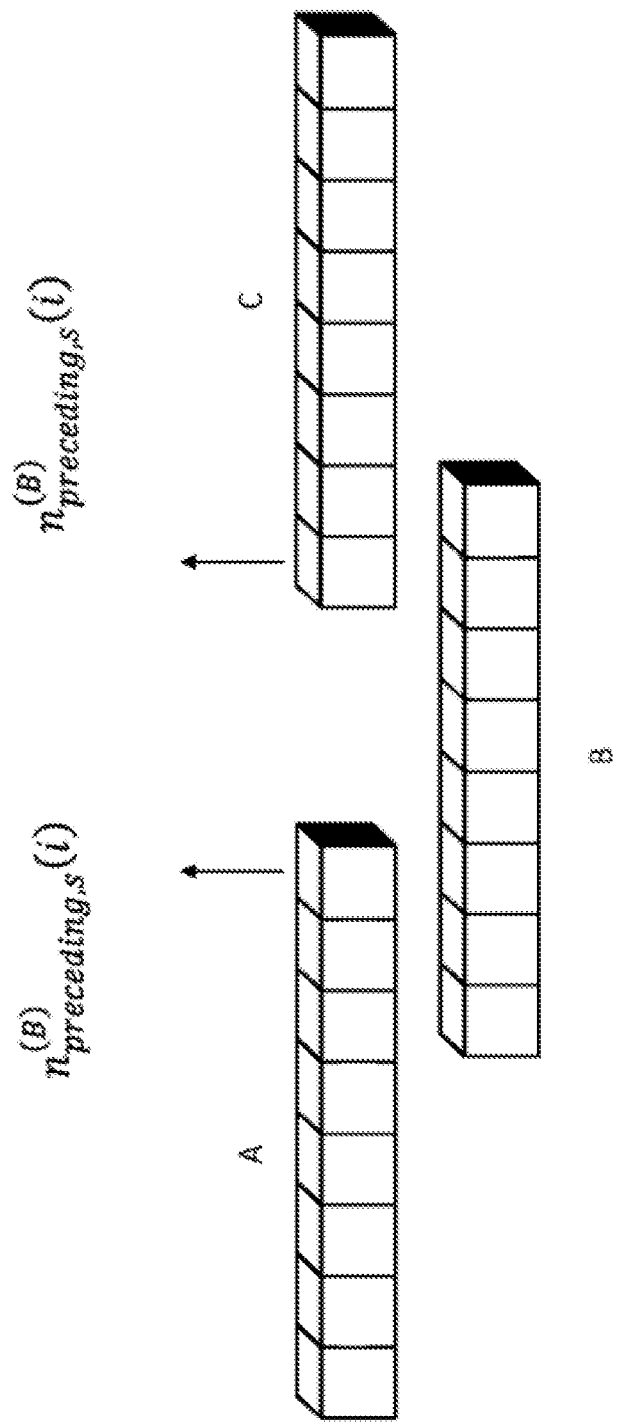

Embodiments of the rhino loss function with an overlapping marking window in a sequence of data without reassignment will now be described with reference to FIG. 12B. The overlapping marking window for a sequence of data can be solved by modifying the rhino loss function. However, there is at least one difference between the method proposed for object detection and the one that can be used for a sequence of data. The difference is that each detection for a sequence of data is sequential. In other words, the order of detection at each time frame of the sequence is important. For example, if there is a sequence of data with labels ABC, only the ABC detection order is the correct estimation and all other estimations including BAC or ACB are incorrect. But in object detection, the order of detection does not make any difference and so there is a modification in the method proposed in some embodiments.

Similar to overlapClass$_{n,s}^{(j)}$(i) discussed herein, overlapClass$_{preceding,s}^{(j)}$(i) and overlapClass$_{suceeding,s}^{(j)}$(i) are defined to include the indices of overlapping classes that come before and after the sth phoneme. For example, if the sequence ABC has overlapping areas, overlapClass$_{preceding,s}^{(j)}$(i) for class B would be the index of class A and overlapClass$_{suceeding,s}^{(j)}$(i) for class B would be the index of class C. Also, $n_{preceding,s}^{(j)}$(i) is defined to be the end time frame of a preceding class (here class A) in an overlapping area, and $n_{suceeding,s}^{(j)}$(i) is defined to be the start time frame of a succeeding class (here class C) in an overlapping area. This is shown in the example of FIG. 12B.

The modified rhino loss function can be written as follows:

$$u_{n,s}^{(j)}(i) = \prod_{k \in overlap\,Class_{suceeding,s}^{(j)}(i)} \prod_{m=n}^{n_{preceding,s}^{(j)}(i)} msk_{m,s}^{(j)}(1 - y_m^{(k)}(i)) \quad (18)$$

$$v_{n,s}^{(j)}(i) = \prod_{k \in overlap\,Class_{suceeding,s}^{(j)}(i)} \prod_{m=n_{suceeding,s}^{(j)}(i)}^{n} msk_{m,s}^{(j)}(1 - y_m^{(k)}(i)) \quad (19)$$

$$p_{n,s}^{(j)}(i) = \quad (20)$$

$$(1 - d_{0,s}^{(j)}(i))(1 - d_{1,s}^{(j)}(i)) \ldots (u_{n,s}^{(j)}(i))(d_{n,s}^{(j)}(i))(v_{n,s}^{(j)}(i)) \ldots (1 - d_{N^2-1,s}^{(j)}(i))$$

In some aspects, $n_{preceding,s}^{(j)}(i) \geq n$ and $n_{suceeding,s}^{(j)} \leq n$ for each time frame n. If either of these two conditions is not met, then there is no need to compute the multiplications in (18) or (19).

The techniques described herein provide a general solution for any classification problem and thus can be applied to many problems including object detection, keyword spotting, acoustic event detection, and speech recognition. The disclosure can provide an opportunity to solve many practical problems in which high accuracy with low computational complexity is an important requirement.

Figure 13:
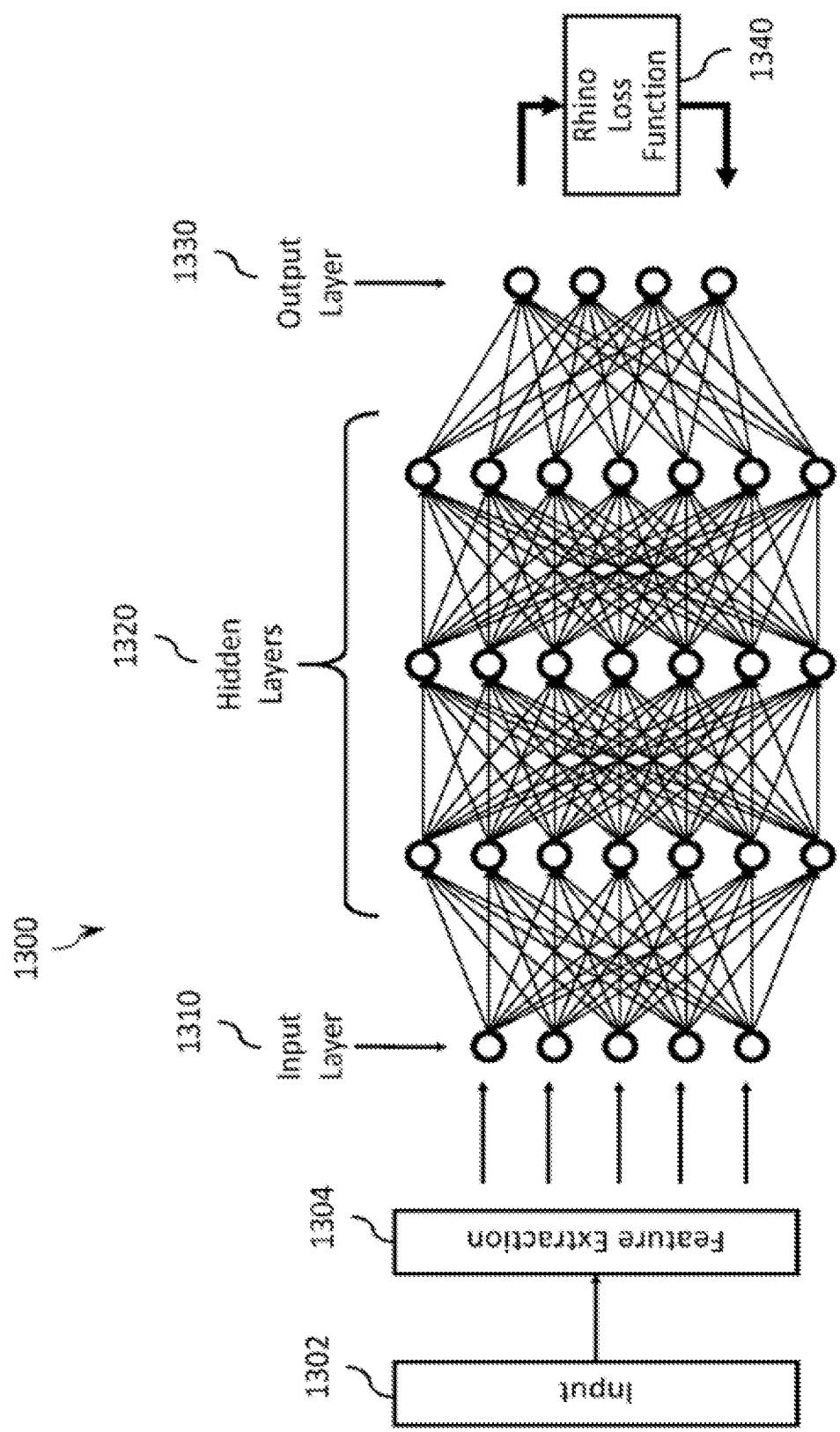
FIG. 13 illustrates an example neural network, in accordance with one or more embodiments of the present disclosure.

Referring to FIG. 13, an example neural network and training process that may be used to train artificial intelligence models based on the rhino loss function disclosed herein for object detection, speaker identification, and other classifications will now be described, in accordance with one or more embodiments. The neural network 1300 may be implemented as any neural network configured to receive input data samples and generate classifications as taught herein, such as a recurrent neural network, a convolutional neural network (CNN), or other neural network.

The neural network 1300 is trained using a supervised learning process that compares network output data to ground truth data (e.g., expected network output data). For a speaker verification system, for example, a training dataset 1302 may include sample speech input (e.g., an audio sample) labeled with a corresponding speaker ID. The input data 1302 may comprise other labeled data types, such as a plurality of images labeled with object classification data, audio data labeled for phoneme recognition, etc. In some embodiments, the input data 1302 may include one or more frames of input data and one or more frames of ground truth data to be paired with the one or more frames of input data, respectively. Further, in some embodiments, the input data 1302 may be provided to a feature extraction process 1304 to generate a batch of features, which the neural network 1300 may process to generate output data. Put differently, one or more frames of input data (of the input data 1302) may be provided to the feature extraction process 1304, and then mapped to one or more frames of output data based on an algorithm of the neural network 1300. In some aspects, differences between the one or more frames of output data and one or more frames of ground truth data (of the input data 1302) may be determined using a rhino loss function 1340 as disclosed herein (e.g., the rhino loss function ($L_{rhino}(i)$) of Equation 9 or the total detection loss function ($L_{rhino}^{total}$) of Equation 10) and fed back into the neural network 1300 to make corrections to various trainable weights and biases (referred to collectively as "parameters"). The loss may be fed back into the neural network 1300 using a back-propagation technique (e.g., using a stochastic gradient descent algorithm or similar algorithm). In some examples, training data combinations may be presented to the neural network 1300 multiple times until the overall rhino loss value converges to an acceptable level.

In some examples, each of an input layer 1310, hidden layers 1320, and/or the output layer 1330 include one or more neurons, with each neuron applying a combination (e.g., a weighted sum using a trainable weighting matrix W) of its inputs x, adding an optional trainable bias b, and applying an activation function f to generate an output a as shown in the equation $a=f(Wx+b)$. In some examples, the activation function f may be a linear activation function, an activation function with upper and/or lower limits, a log-sigmoid function, a hyperbolic tangent function, a rectified linear unit function, and/or the like. In some examples, each of the neurons may have a same or a different activation function.

After training, the neural network 1300 may be implemented in a run time environment of a remote device to receive input data and generate associated classifications. It should be understood that the architecture of the neural network 1300 is representative only and that other architectures are possible, including a neural network with only one hidden layer, a neural network with different numbers of neurons, a neural network without an input layer and/or output layer, a neural network with recurrent layers, and/or the like.

In other embodiments, the training dataset 1302 may include captured sensor data associated with one or more types of sensors, such as speech utterances, visible light images, fingerprint data, and/or other types of biometric information. The training dataset may include images of a user's face for a face identification system, fingerprint images for a fingerprint identification system, retina images for a retina identification system, and/or datasets for training another type of biometric identification system.

Figure 14:
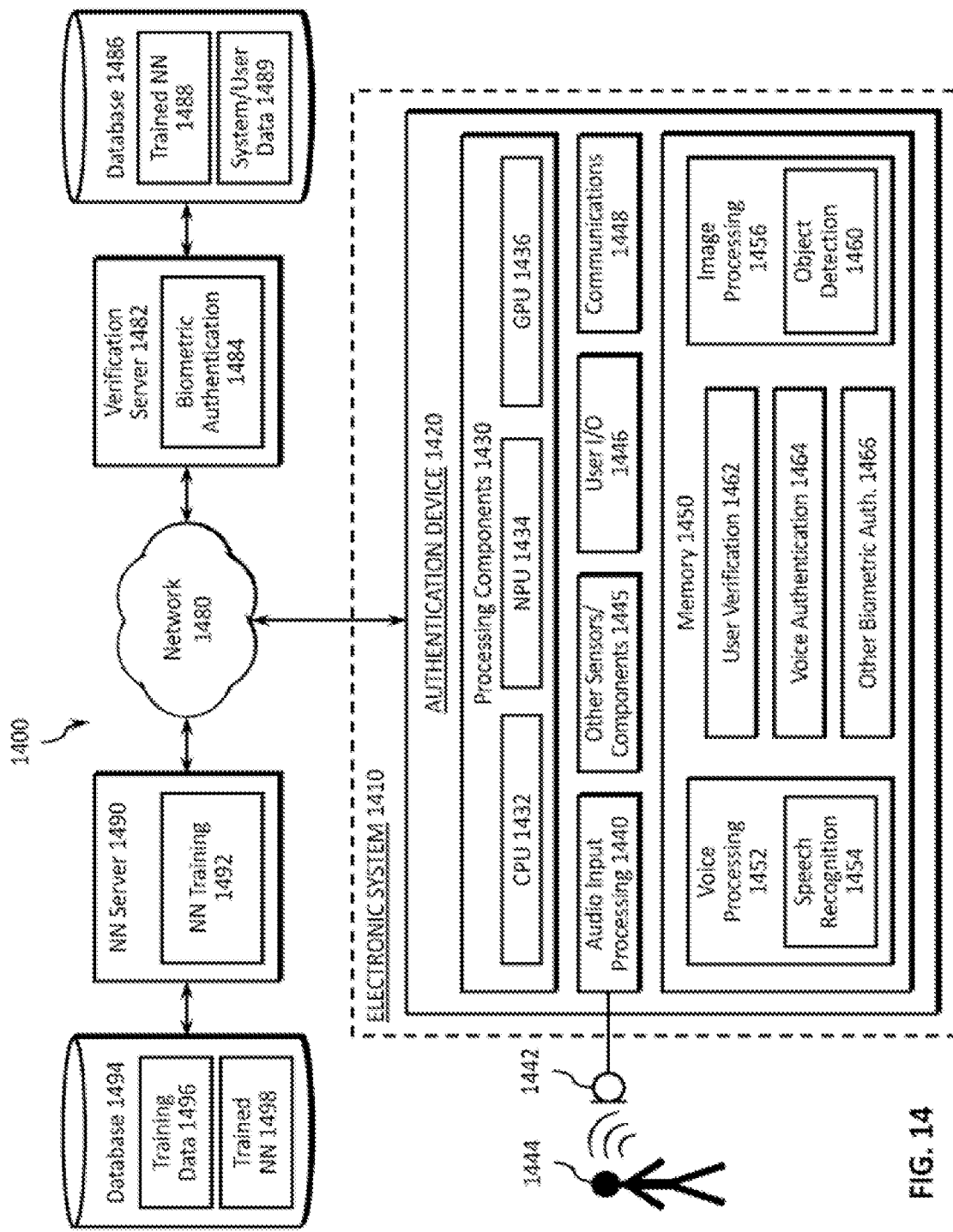
FIG. 14 illustrates an example object detection system, in accordance with one or more embodiments of the present disclosure.

FIG. 14 illustrates an example system 1400 configured to implement a generalized negative log-likelihood loss for speaker verification, in accordance with one or more embodiments of the present disclosure. Not all of the depicted components in the example system 1400 may be required, however, and one or more embodiments may include additional components not shown in the figure. Variations in the arrangement and type of the components may be made without departing from the scope of the disclosure, including additional components, different components, and/or fewer components. While the example system of FIG. 14 is configured for speaker verification, it will be appreciated that the methods disclosed herein may be implemented through other system configurations.

The system 1400 includes an authentication device 1420 including processing components 1430, audio input processing components 1440, user input/output components 1446, communications components 1448, and a memory 1450. In some embodiments, other sensors/components 1445 may be included to facilitate additional biometric authentication modalities, such as fingerprint recognition, facial recognition, iris recognition, etc. Various components of authentication device 1420 may interface and communicate through a bus or other electronic communications interface.

The authentication device 1420, for example, may be implemented on a general-purpose computing device, such as a system on a chip, integrated circuit, or other processing system and may be configured to operate as part of an electronic system 1410. In some embodiments, the electronic system 1410 may be, or may be coupled to, a mobile phone, a tablet, a laptop computer, a desktop computer, an automobile, a personal digital assistant (PDA), a television, a voice interactive device (e.g., a smart speaker, conference speaker system, etc.), a network or system access point, and/or other system of device configured to receive user voice input for authentication and/or identification.

The processing components 1430 may include one or more of a processor, a controller, a logic device, a microprocessor, a single-core processor, a multi-core processor, a microcontroller, a programmable logic device (PLD) (e.g., field programmable gate array (FPGA)), a digital signal processing (DSP) device, an application specific integrated circuit, or other device(s) that may be configured by hardwiring, executing software instructions, or a combination of both, to perform various operations discussed herein for audio source enhancement. In the illustrated embodiment, the processing components 1430 include a central processing unit (CPU) 1432, a neural processing unit (NPU) 1434 configured to implement logic for executing machine learning algorithms, and/or a graphics processing unit (GPU) 1436. The processing components 1430 are configured to execute instructions stored in the memory 1450 and/or other memory components. The processing components 1430 may perform operations of the authentication device 1420 and/or electronic system 1410, including one or more of the processes and/or computations disclosed herein.

The memory 1450 may be implemented as one or more memory devices or components configured to store data, including audio data, user data, trained neural networks, authentication data, and program instructions. The memory 1450 may include one or more types of memory devices including volatile and non-volatile memory devices, such as random-access memory (RAM), read-only memory (ROM), electrically-erasable programmable read-only memory (EEPROM), flash memory, hard disk drive, and/or other types of memory.

Audio input processing components 1440 include circuits and digital logic components for receiving an audio input signal, such as speech from one or more users 1444 that is sensed by an audio sensor, such as one or more microphones 1442. In various embodiments, the audio input processing components 1440 are configured to process a multi-channel input audio stream received from a plurality of microphones, such as a microphone array, and generate an enhanced target audio signal comprising speech from the user 1444.

Communications components 1448 are configured to facilitate communication between the authentication device 1420 and the electronic system 1410 and/or one or more networks and external devices. For example, the communications components 1448 may enable Wi-Fi (e.g., IEEE 802.11) or Bluetooth connections between the electronic system 1410 and one or more local devices or enable connections to a wireless router to provide network access to an external computing system via a network 1480. In various embodiments, the communications components 1448 may include wired and/or other wireless communications components for facilitating direct or indirect communications between the authentication device 1420 and/or other devices and components.

The authentication device 1420 may further include other sensors/components 1445, depending on a particular implementation. The other sensors/components 1445 may include other biometric input sensors (e.g., fingerprint sensors, retina scanners, video or image capture for face recognition, etc.), and the user input/output components 1446 may include I/O components such as a touchscreen, a touchpad display, a keypad, one or more buttons, dials, or knobs, loudspeaker and/or other components operable to enable a user to interact with the electronic system 1410.

The memory 1450 includes program logic and data configured to facilitate speaker verification in accordance with one or more embodiments disclosed herein, and/or perform other functions of the authentication device 1420 and/or electronic system 1410. The memory 1450 includes program logic for instructing processing components 1430 to perform voice processing 1452, including speech recognition 1454, on an audio input signal received through the audio input processing components 1440. In various embodiments, the voice processing 1452 logic is configured to identify an audio sample comprising one or more spoken utterances for speaker verification processing.

The memory 1450 may further include program logic for implementing user verification controls 1462, which may include security protocols for verifying a user 1444 (e.g., to validate the user's identity for a secure transaction, to identify access rights to data or programs of the electronic system 1410, etc.). In some embodiments, the user verification controls 1462 include program logic for an enrollment and/or registration procedure to identify a user and/or obtain user voice print information, which may include a unique user identifier and one or more embedding vectors. The memory 1450 may further include program logic for instructing the processing components 1430 to perform a voice authentication process 1464 as described herein, which may include neural networks trained for speaker verification using generalized negative log-likelihood loss processes, feature extraction components for extracting features from an input audio sample, processes for identifying embedding vectors and generating centroid or other vectors and confidence scores for use in speaker identification.

The memory 1450 may further include other biometric authentication processes 1466, which may include facial recognition, fingerprint identification, retina scanning, and/or other biometric processing for a particular implementation. The other biometric authentication processes 1466 may include feature extraction processes, one or more neural networks, statistical analysis modules, and/or other processes. In some embodiments, the user verification controls 1462 may process confidence scores or other information from the voice authentication process 1464 and/or one or more other biometric authentication processes 1466 to generate the speaker identification determination. In some embodiments, the other biometric authentication processes 1466 include a neural network trained through a process using a batch of biometric input data and a rhino loss function as described herein.

The memory 1450 includes program logic for instructing processing components 1430 to perform image processing 1456, including object detection 1460, on images received through one or more components (e.g., other sensors/components 1445 such as image capture components, communications components 1448, etc.).

In various embodiments, the authentication device 1420 may operate in communication with one or more servers across a network 1480. For example, a neural network server 1490 includes processing components and program logic configured to train neural networks (e.g., neural network training module 1492), for use in speaker verification as described herein. In some embodiments, a database 1494 stores training data 1496, including training datasets and validation datasets for use in training one or more neural network models. Trained neural networks 1498 may also be stored in the database 1494 for downloading to one or more runtime environments, for use in the voice authentication processes 1464. The trained neural networks 1498 may also be provided to the one or more verification servers 1482, which provide cloud or other networked speaker identification services. For example, the verification server 1482 may receive biometric data from an authentication device 1420, such as voice data or other biometric data, and upload data to the verification server 1482 for further processing. The uploaded data may include a received audio sample, extracted features, embedding vectors, and/or other data. The verification server 1482, through a biometric authentication process 1484 that includes one or more neural networks (e.g., trained neural network 1488 stored in a database 1486) trained in accordance with the present disclosure, and system and/or user data 1489, may be used to compare the sample against known authentication factors and/or user identifiers to determine whether the user 1444 has been verified. In various embodiments, the verification server 1482 may be implemented to provide authentication for a financial service or transaction, access to a cloud or other online system, cloud or network authentication services for use with an electronic system 1410, etc.

FIG. 15 is a flowchart depicting an example operation 1500 for training a neural network (e.g., an RNN or CNN), in accordance with one or more embodiments. The example operation 1500 may be performed by a machine learning system (e.g., the neural network server 1490 of FIG. 14) to train a neural network to detect one or more objects in an image (or one or more phonemes in a sequence of audio frames) such that the neural network activates only one neuron for each respective object (or phoneme) detected.

The machine learning system may obtain a frame of first input data and a frame of first ground truth data, where the frame of first ground truth data is associated with a first binary mask having a plurality of first values (e.g., $\text{msk}_{n,s}^{(j)}(i)$ of Equation 1) and a second binary mask having a plurality of second values (e.g., $\text{mskg}_n^{(j)}(i)$ of Equation 6) (1510). In some embodiments, the frame of first input data may represent a frame (or sample) of image data. The frame of first ground truth data may include an image to be paired with the frame of first input data, where the image depicts one or more objects and one or more bounding boxes, respectively, that are associated with the one or more objects. Each of the one or more objects may represent an object of interest (e.g., an object associated with a particular class). In some other embodiments, the frame of first input data may represent a frame (or sample) of audio data. The frame of first ground truth data may include audio data to be paired with the frame of first input data, where the audio data includes at least part of a phoneme and a marking window indicating the phoneme. The phoneme may represent a phoneme of interest (e.g., a phoneme associated with a particular class).

In some embodiments, the first binary mask having a plurality of first values may represent a ground truth binary mask that includes values of 1 corresponding to grid cells (or portions) of an associated image that depict at least part of an object of interest and values of 0 corresponding to the remaining grid cells of the associated image; and the second binary mask having a plurality of second values may represent a ground truth binary mask that includes values of 0 corresponding to the grid cells of the associated image that depict at least part of an object of interest and values of 1 corresponding to the remaining grid cells of the associated image. In some other embodiments, the first binary mask having a plurality of first values may represent a ground truth binary mask that includes values of 1 corresponding to portions (e.g., sub-frames or frequency bands) of associated audio data that include at least part of a phoneme of interest and values of 0 corresponding to the remaining portions of the associated audio data; and the second binary mask having a plurality of second values may represent a ground truth binary mask that includes values of 0 corresponding to the portions of the associated audio data that include at least part of a phoneme of interest and values of 1 corresponding to the remaining portions of the associated audio data.

The machine learning system may further map the frame of first input data to a frame of first output data based on a neural network algorithm, where the frame of first output data is associated with a plurality of first probability values (e.g., $y_n^{(j)}(i)$ of Equation 1) (1520). In some embodiments, each probability value of the plurality of first probability values may indicate a likelihood that a respective grid cell (or portion) of the frame of first input data depicts (or includes) at least part of an object (or phoneme) of interest. Further, the neural network algorithm may comprise a CNN algorithm or an RNN algorithm.

The machine learning system may determine a first detection loss (e.g., $L_{det}^{obj}(i)$ of Equation 2) based at least in part on a product (e.g., multiplication) of a respective probability value of the plurality of first probability values (e.g., $y_n^{(j)}(i)$) and a respective value of the plurality of first values (e.g., $\text{msk}_{n,x}^{(j)}(i)$) (1530). The machine learning system may also determine a first non-detection loss (e.g., $L_{det}^{no-obj}(i)$ of Equation 8) based at least in part on a product (e.g., multiplication) of the respective probability value of the plurality of first probability values (e.g., $y_n^{(j)}(i)$) and a respective value of the plurality of second values (e.g., $\text{mskg}_n^{(j)}(i)$) (1540). The machine learning system may update the neural network algorithm based at least in part on the first detection loss and the first non-detection loss (1550). In some embodiments, updating the neural network algorithm may include determining a total loss (e.g., a rhino loss, a total detection loss, or other total loss described herein) based at least in part on the first detection loss and the first non-detection loss. Further, updating the neural network algorithm may include determining one or more parameters of the neural network algorithm that reduce the total loss.

In some embodiments, the machine learning system may obtain a frame of second input data and a frame of second ground truth data, where the frame of second ground truth data is associated with a third binary mask having a plurality of third values and a fourth binary mask having a plurality of fourth values. In some embodiments, the frame of first input data and the frame of second input data may represent a sequence of audio frames. The machine learning system may map the frame of second input data to a frame of second output data based on the neural network algorithm, where the frame of second output data is associated with a plurality of second probability values. The machine learning system may further determine a second detection loss based at least in part on a product (e.g., multiplication) of a respective probability value of the plurality of second probability values and a respective value of the plurality of third values. The machine learning system may determine a second non-detection loss based at least in part on a product (e.g., multiplication) of the respective probability value of the plurality of second probability values and a respective value of the plurality of fourth values. In some embodiments, the neural network algorithm may be further updated based on the second detection loss and the second non-detection loss.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   obtaining a frame of first input data and a frame of first ground truth data, wherein the frame of first ground truth data is associated with a first binary mask having a plurality of first values and a second binary mask having a plurality of second values;
   mapping the frame of first input data to a frame of first output data based on a neural network algorithm, wherein the frame of first output data is associated with a plurality of first probability values;
   determining a first detection loss based at least in part on a product of a respective probability value of the plurality of first probability values and a respective value of the plurality of first values;
   determining a first non-detection loss based at least in part on a product of the respective probability value of the plurality of first probability values and a respective value of the plurality of second values; and
   updating the neural network algorithm based at least in part on the first detection loss and the first non-detection loss.

2. The method of claim 1, wherein the frame of first input data comprises an image and each probability value of the plurality of first probability values indicates a likelihood that a respective portion of the frame of first input data depicts at least part of an object of interest.

3. The method of claim 1, wherein the frame of first ground truth data includes an image depicting one or more objects and one or more bounding boxes, respectively, associated therewith.

4. The method of claim 1, wherein the frame of first input data comprises an audio frame and each probability value of the plurality of first probability values indicates a likelihood that a respective portion of the frame of first input data is associated with a phoneme.

5. The method of claim 1, wherein the frame of first ground truth data comprises audio data including at least part of a phoneme and a marking window indicating the phoneme.

6. The method of claim 1, further comprising:
   obtaining a frame of second input data and a frame of second ground truth data, wherein the frame of second ground truth data is associated with a third binary mask having a plurality of third values and a fourth binary mask having a plurality of fourth values;
   mapping the frame of second input data to a frame of second output data based on the neural network algorithm, wherein the frame of second output data is associated with a plurality of second probability values;
   determining a second detection loss based at least in part on a product of a respective probability value of the plurality of second probability values and a respective value of the plurality of third values; and
   determining a second non-detection loss based at least in part on a product of the respective probability value of the plurality of second probability values and a respective value of the plurality of fourth values, wherein the neural network algorithm is further updated based on the second detection loss and the second non-detection loss.

7. The method of claim 6, wherein the frame of first input data and the frame of second input data represent a sequence of audio frames.

8. The method of claim 1, wherein the neural network algorithm comprises a convolutional neural network (CNN) algorithm.

9. The method of claim 1, wherein the neural network algorithm comprises a recurrent neural network (RNN) algorithm.

10. The method of claim 1, wherein the updating of the neural network algorithm comprises:
    determining a total loss based at least in part on the first detection loss and the first non- detection loss; and
    determining one or more parameters of the neural network algorithm that reduce the total loss.

11. A machine learning system comprising:
    a processing system; and
    a memory storing instructions that, when executed by the processing system, cause the machine learning system to:
        obtain a frame of first input data and a frame of first ground truth data, wherein the frame of first ground truth data is associated with a first binary mask having a plurality of first values and a second binary mask having a plurality of second values;
        map the frame of first input data to a frame of first output data based on a neural network algorithm, wherein the frame of first output data is associated with a plurality of first probability values;
        determine a first detection loss based at least in part on a product of a respective probability value of the plurality of first probability values and a respective value of the plurality of first values;
        determine a first non-detection loss based at least in part on a product of the respective probability value of the plurality of first probability values and a respective value of the plurality of second values; and
        update the neural network algorithm based at least in part on the first detection loss and the first non-detection loss.

12. The machine learning system of claim 11, wherein the frame of first input data comprises an image and each probability value of the plurality of first probability values indicates a likelihood that a respective portion of the frame of first input data depicts at least part of an object of interest.

13. The machine learning system of claim 11, wherein the frame of first ground truth data includes an image depicting one or more objects and one or more bounding boxes, respectively, associated therewith.

14. The machine learning system of claim 11, wherein the frame of first input data comprises an audio frame and each probability value of the plurality of first probability values indicates a likelihood that a respective portion of the frame of first input data is associated with a phoneme.

15. The machine learning system of claim 11, wherein the frame of first ground truth data comprises audio data including at least part of a phoneme and a marking window indicating the phoneme.

16. The machine learning system of claim 11, wherein execution of the instructions further causes the machine learning system to:
  obtain a frame of second input data and a frame of second ground truth data, wherein the frame of second ground truth data is associated with a third binary mask having a plurality of third values and a fourth binary mask having a plurality of fourth values;
  map the frame of second input data to a frame of second output data based on the neural network algorithm, wherein the frame second output data is associated with a plurality of second probability values;
  determine a second detection loss based at least in part on a product of a respective probability value of the plurality of second probability values and a respective value of the plurality of third values; and
  determine a second non-detection loss based at least in part on a product of the respective probability value of the plurality of second probability values and a respective value of the plurality of fourth values, wherein updating the neural network algorithm is further based on the second detection loss and the second non-detection loss.

17. The machine learning system of claim 16, wherein the frame of first input data and the frame of second input data represent a sequence of audio frames.

18. The machine learning system of claim 11, wherein the neural network algorithm comprises a convolutional neural network (CNN) algorithm.

19. The machine learning system of claim 11, wherein the neural network algorithm comprises a recurrent neural network (RNN) algorithm.

20. The machine learning system of claim 11, wherein execution of the instructions further causes the machine learning system to:
  determine a total loss based at least in part on the first detection loss and the first non- detection loss; and
  determine one or more parameters based of the neural network algorithm that reduce the total loss.

* * * * *